United States Patent
Sasaki et al.

(10) Patent No.: US 6,959,188 B2
(45) Date of Patent: Oct. 25, 2005

(54) CDMA PORTABLE TELEPHONE APPARATUS

(75) Inventors: Makoto Sasaki, Urayasu (JP); Kazuki Hoshino, Tokyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 371 days.

(21) Appl. No.: 10/297,566

(22) PCT Filed: Mar. 18, 2002

(86) PCT No.: PCT/JP02/02551

§ 371 (c)(1),
(2), (4) Date: Dec. 9, 2002

(87) PCT Pub. No.: WO02/082845

PCT Pub. Date: Oct. 17, 2002

(65) Prior Publication Data

US 2004/0203784 A1 Oct. 14, 2004

(30) Foreign Application Priority Data

Mar. 30, 2001 (JP) ................. 2001-101698

(51) Int. Cl.[7] .............................. H04Q 7/20
(52) U.S. Cl. .................................. 455/435.1
(58) Field of Search ................ 455/436, 435.1

(56) References Cited

U.S. PATENT DOCUMENTS

2004/0203784 A1 * 10/2004 Sasaki et al. ............... 455/436

FOREIGN PATENT DOCUMENTS

| JP | 10-191429 | 7/1998 |
| JP | 2000-106692 | 4/2000 |
| JP | 2001-054158 | 2/2001 |
| JP | 2001-268616 | 9/2001 |
| JP | 2002-027531 | 1/2002 |

* cited by examiner

Primary Examiner—William D. Cumming
(74) Attorney, Agent, or Firm—Pearne & Gordon LLP

(57) ABSTRACT

A CDMA portable telephone apparatus comprises a transmission/reception block 85, a logic control block 76, and a failure-base-station storage block 87. The logic control block 76 selects one base station from a plurality of base stations via the transmission/reception block 85 so as to set a telephone communication line. In such a case that no response is issued from the selected base station and setting of the telephone communication line fails, the logic control block 76 stores the selected base station into the failure-base-station storage block 87, and in a next selecting operation for a base station, the logic control block 76 excludes the selecting operation of the base station stored in the failure-base-station storage block 87.

5 Claims, 26 Drawing Sheets

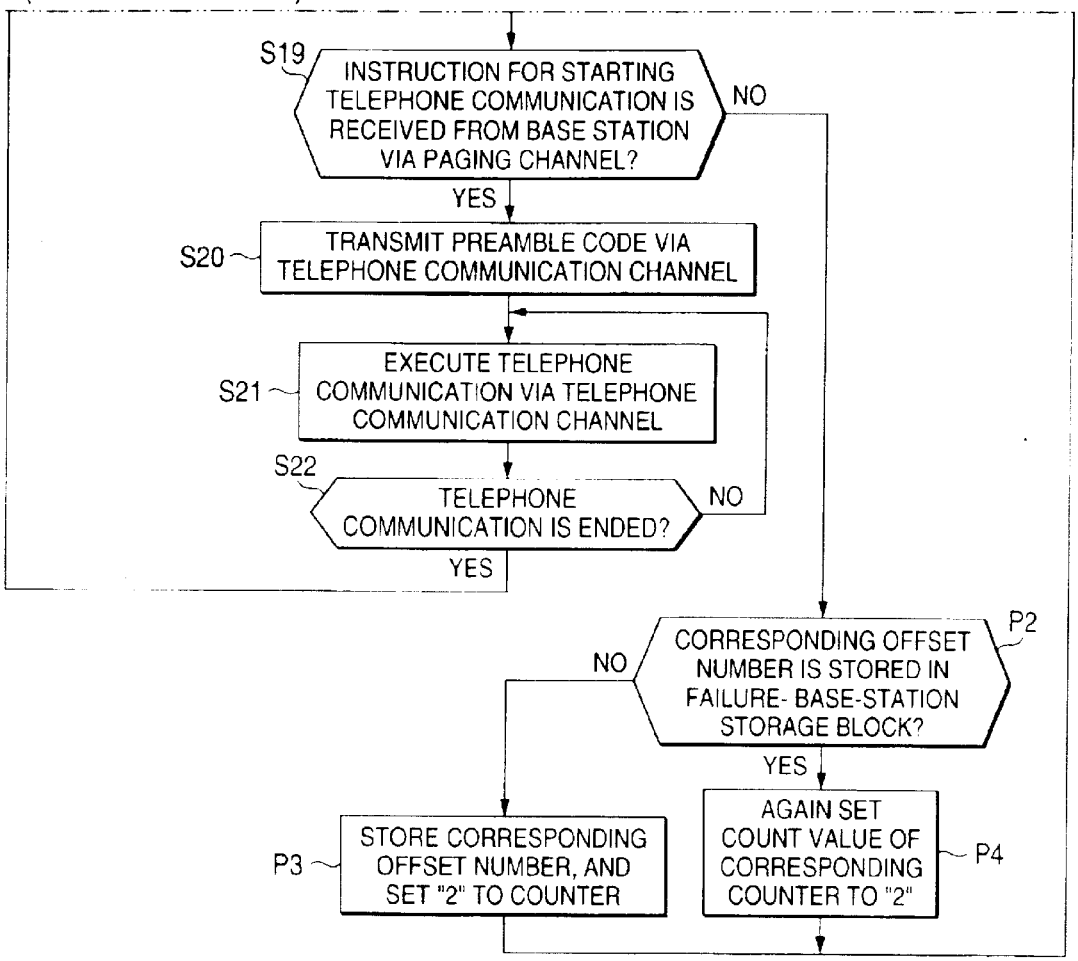

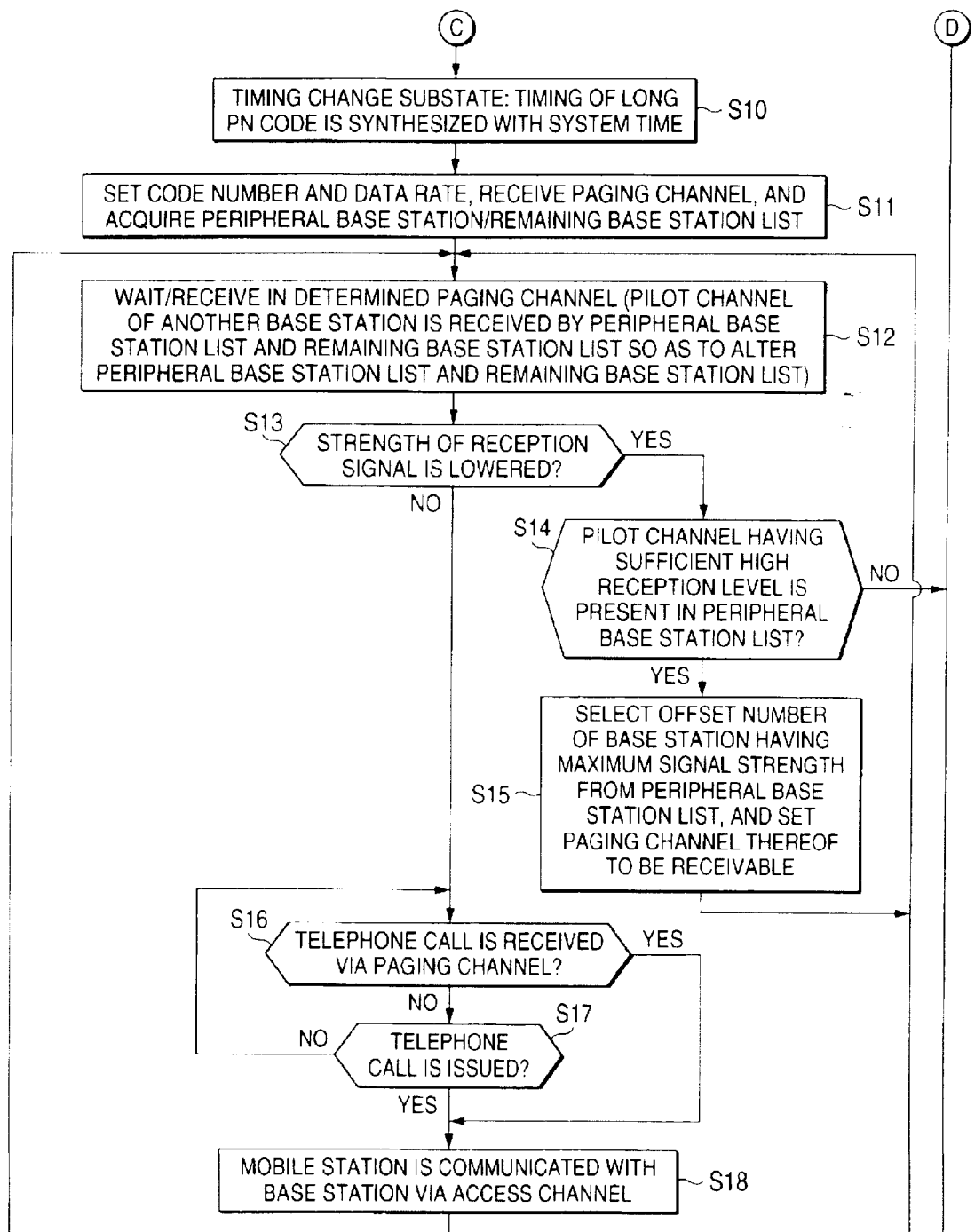

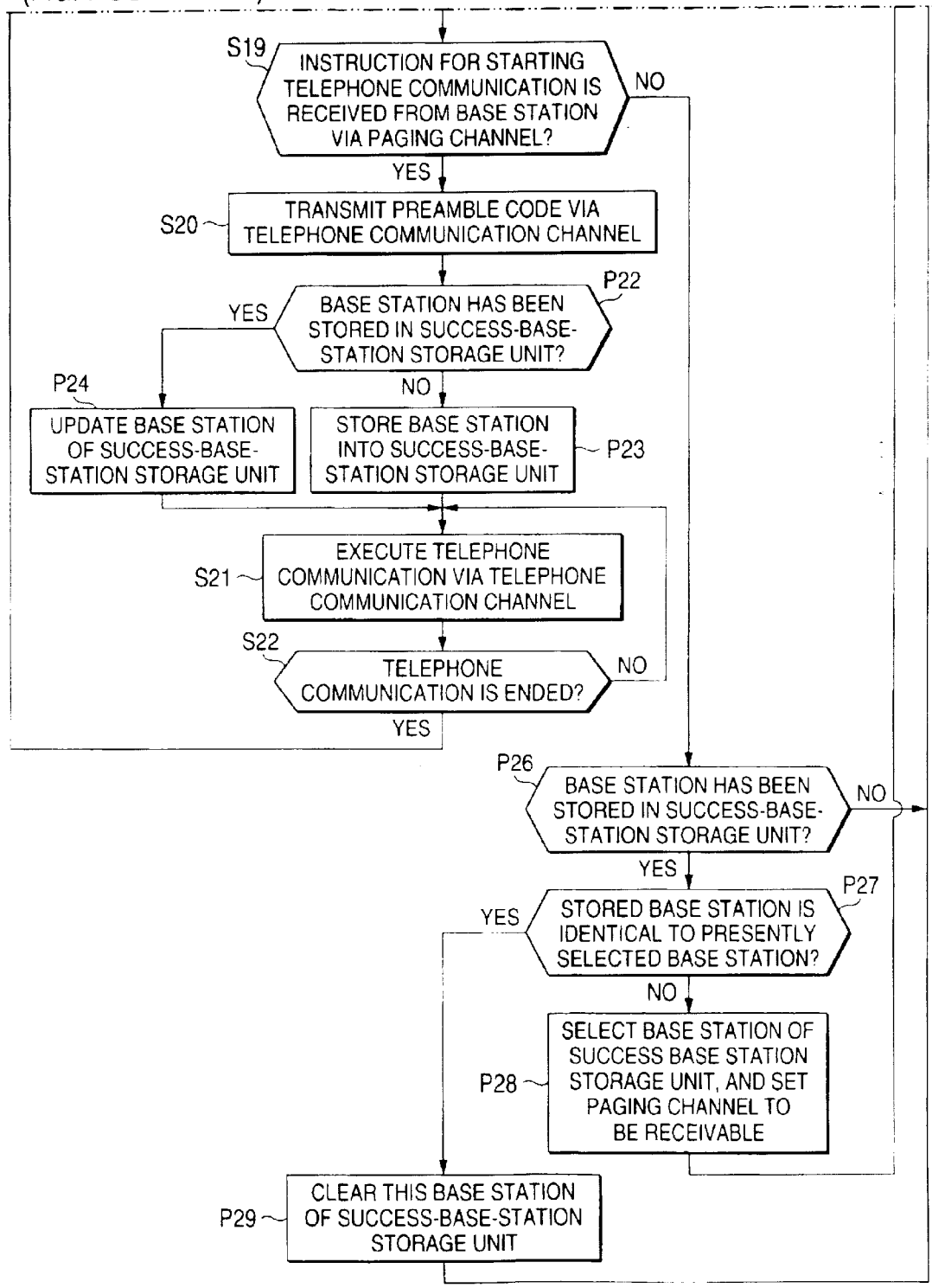

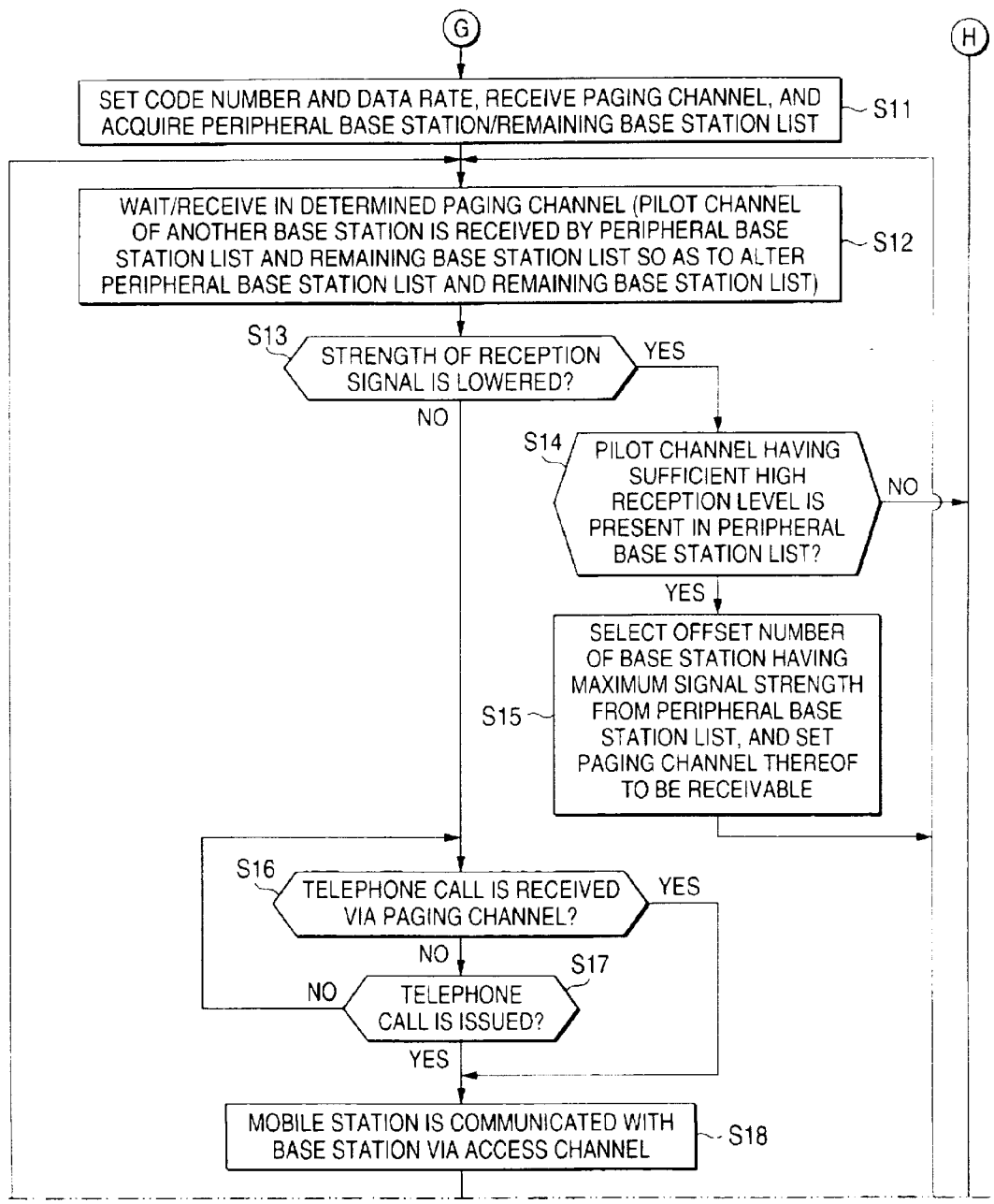

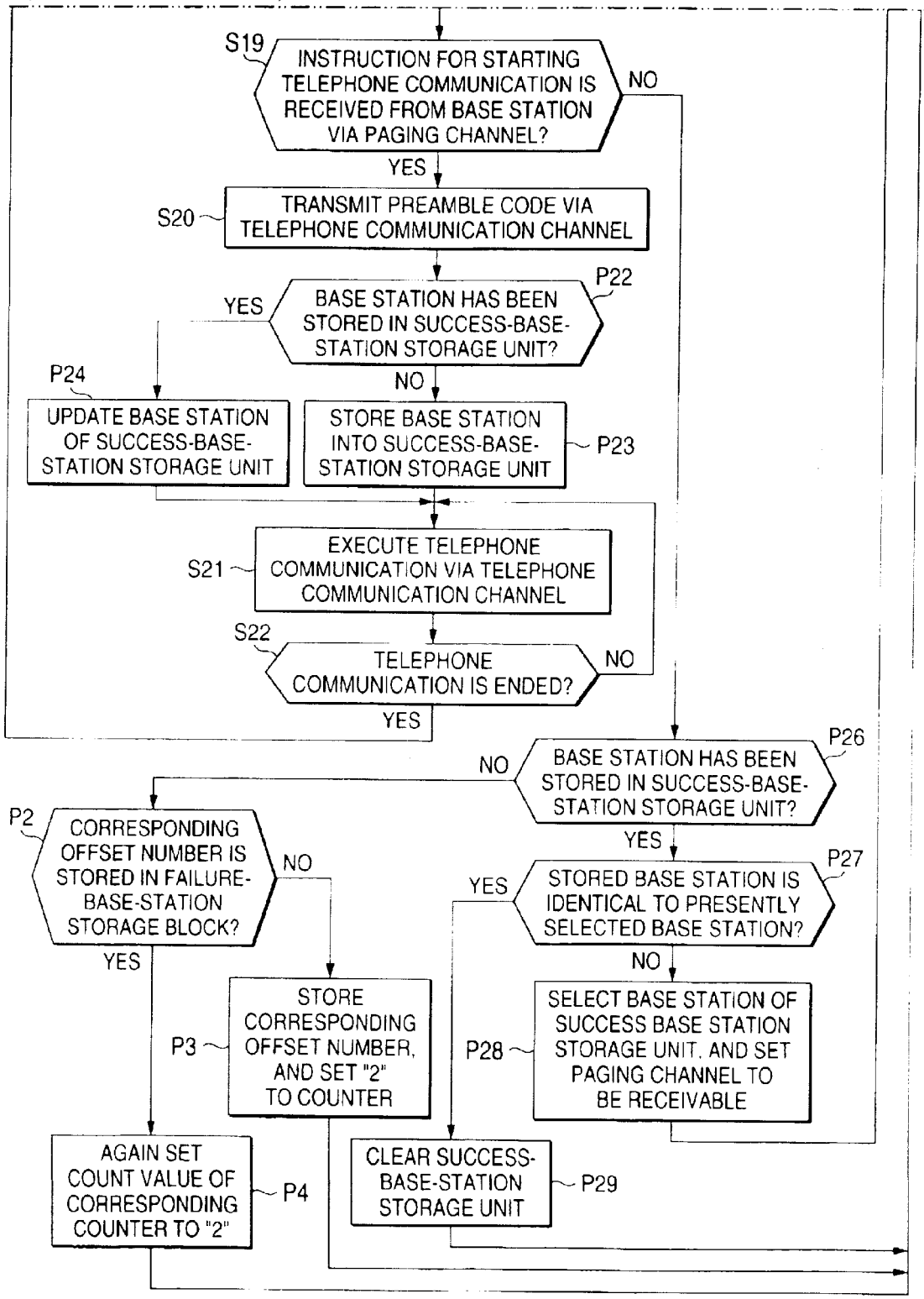

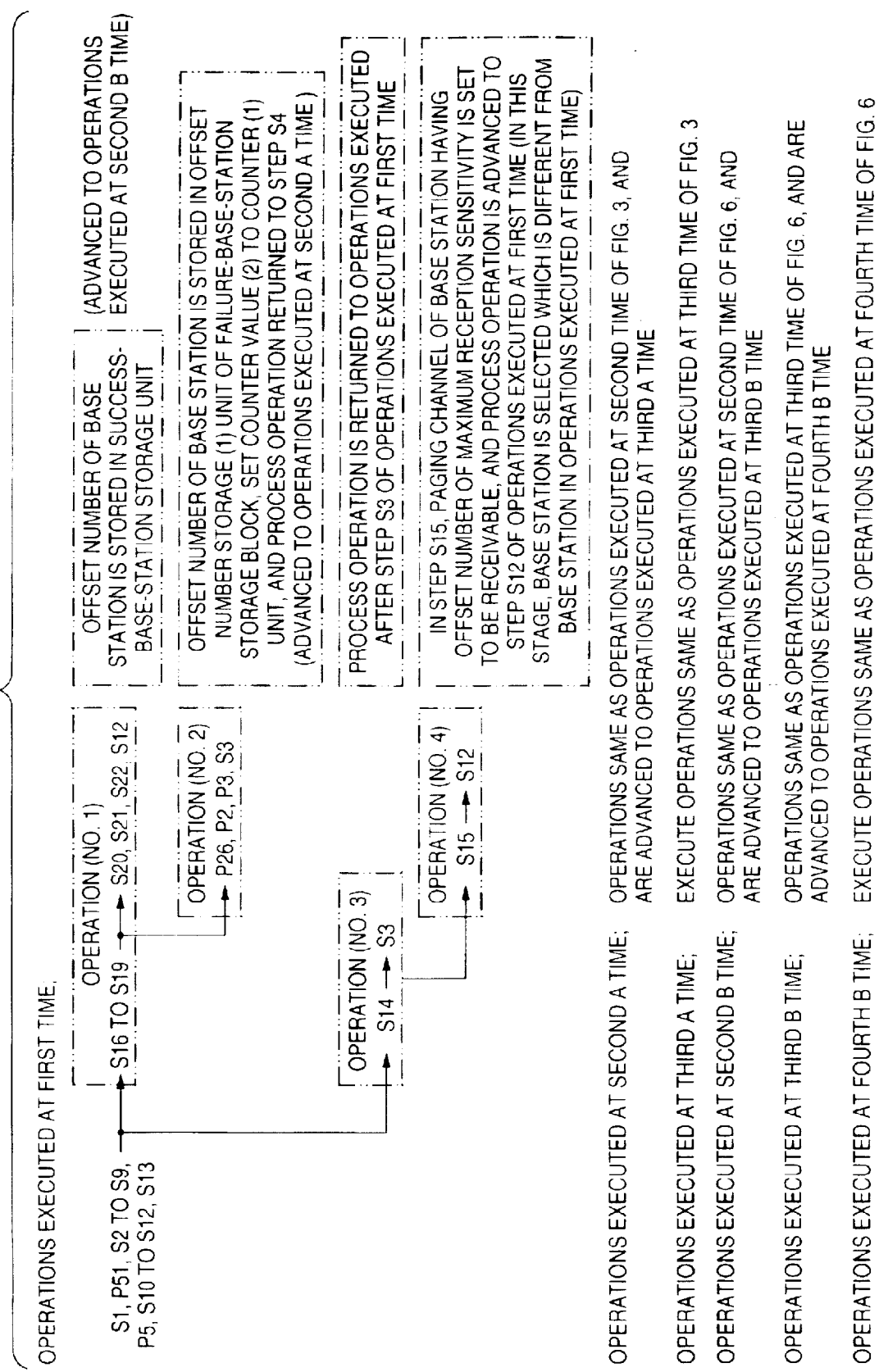

(FIG. 15 CONTINUED)
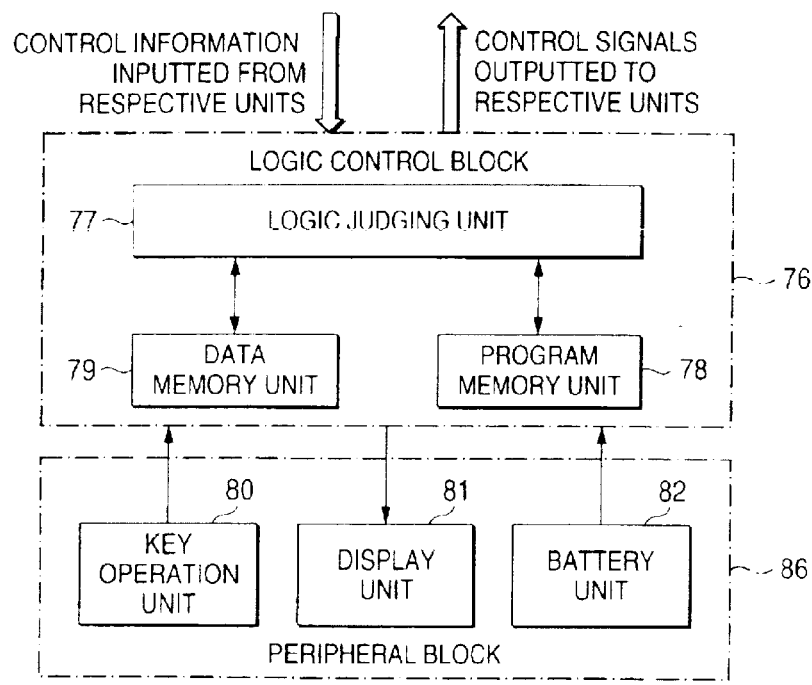

FIG. 16  PRIOR ART

CHIP RATE: 1.2288 Mbps
BIT NUMBER: 64
TIME PERIOD: 52.08 μsec

| WALSH CODE | BIT | | | | | | | | | | | | | | | | | ... | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | ... | 62 | 63 | 64 |
| "0" | 0 | 0 | 0 | 0 | 0 | 0 | 0 | 0 | 0 | 0 | 0 | 0 | 0 | 0 | 0 | 0 | 0 | ... | 0 | 0 | 0 |
| "1" | 1 | 1 | 1 | 1 | 1 | 1 | 1 | 1 | 1 | 1 | 1 | 1 | 1 | 1 | 1 | 1 | 1 | ... | 0 | 0 | 0 |
| "_" | 1 | 1 | 1 | 1 | 1 | 1 | 1 | 1 | 1 | 1 | 1 | 1 | 1 | 1 | 1 | 1 | 1 | ... | 1 | 1 | 1 |
| "_" | 0 | 1 | 1 | 0 | 1 | 1 | 1 | 1 | 1 | 1 | 1 | 1 | 0 | 1 | 1 | 0 | 0 | ... | 1 | 1 | 1 |
| "32" | 1 | 1 | 1 | 1 | 1 | 1 | 1 | 1 | 0 | 1 | 1 | 0 | 1 | 1 | 1 | 1 | 1 | ... | 1 | 1 | 0 |
| "_" | 1 | 1 | 1 | 1 | 1 | 1 | 1 | 1 | 1 | 1 | 1 | 1 | 0 | 1 | 0 | 1 | 1 | ... | 1 | 1 | 1 |
| "63" | 0 | 1 | 0 | 1 | 0 | 1 | 0 | 1 | 0 | 1 | 0 | 1 | 0 | 1 | 0 | 1 | 0 | ... | 1 | 0 | 1 |

FIG. 17 PRIOR ART

CHIP RATE; 1.2288 Mbps

BIT NUMBER; $2^{15}$ = 32,768 BITS

OFFSET NUMBER = 32,768/64 = 512

TIME PERIOD; 26.66 μsec

FIG. 18 PRIOR ART

CHIP RATE; 1.2288 Mbps

BIT NUMBER; $2^{24}$ = 4.4 x $10^{12}$ BITS

NUMBER OF CODE = 4.4 TRILIONS

TIME PERIOD = APPROXIMATELY 41 DAYS

FIG. 19  PRIOR ART

| LINE | | WALSH CODE | SHORT PN CODE | LONG PN CODE |
|---|---|---|---|---|
| CODE NUMBER | | 64 | 32.768 | APPROXIMATELY 4.4 TRILLIONS |
| DOWNSTREAM LINE | USED IN EACH BASE STATION | SAME CODE IS USED | DISCRIMINATABLE IN 512 SORTS BY EMPLOYING OFFSET NUMBER | SAME CODE IS USED |
| | USAGE | USED TO DISCRIMINATE PILOT CHANNEL, PAGING CHANNEL AND TELEPHONE COMMUNICATION CHANNEL | USED TO IDENTIFY RESPECTIVE BASE STATIONS | USED TO ENCRYPT PAGING CHANNEL AND TELEPHONE COMMUNICATION CHANNEL BY MASKING |
| UPSTREAM LINE | USED IN EACH MOBILE STATION | SAME CODE IS USED | DISCRIMINATABLE IN 512 SORTS BY EMPLOYING OFFSET NUMBER | DIFFERENCT CODES ARE USED |
| | USAGE | USED TO ENCODE SPEECH SIGNAL | USED TO IDENTIFY RESPECTIVE BASE STATIONS | USE TO DISCRIMINATE ACCESS CHANNEL FROM TELEPHONE COMMUNICATION CHANNEL |

CDMA PORTABLE TELEPHONE APPARATUS

BACKGROUND OF THE INVENTION

1. Field of the Invention

The present invention is related to a CDMA portable telephone apparatus, and more specifically, directed to a CDMA portable telephone apparatus for performing a selection operation of a base station.

2. Description of the Related Art

CDMA portable telephone systems, namely portable telephone systems employed in IS-95 (TIA) of USA, and portable telephone systems (will be abbreviated as a "CdmaOne portable telephone system" herein after) employed in T-53 (ARIB) in Japan are described in "standard specification of CDMA type portable automobile telephone system (ARIB STD-T53)" issued from Japanese Denpa Sangyo Kai (ARIB).

Referring now to FIG. 13 to FIG. 23, a description is made of a selection operation of a base station communicated in the case that a portable telephone (will be referred to as a "mobile station" hereinafter) of a CdmaOne portable telephone system issues a telephone call, or receives a telephone call. FIG. 13 is a block diagram for indicating a conventional arrangement of the CdmaOne portable telephone system, and FIG. 14 is a block diagram for representing an arrangement of a base station. FIG. 15 is a block diagram for showing an arrangement of the base station. FIG. 16 is an explanatory diagram for explaining a Walsh code used in the CdmaOne portable telephone system, FIG. 17 is an explanatory diagram for explaining a short PN (Pseudorandom Noise) code used in the CdmaOne portable telephone system, and FIG. 18 is an explanatory diagram for explaining a long PN code used in the CdmaOne portable telephone system. FIG. 19 is an explanatory diagram for explaining use conditions of the Walsh code, the short PN code, and the long PN code in the CdmaOne portable telephone system. FIG. 20 is a flow chart for briefly explaining operations of the mobile station when a base station pilot channel is selected. FIG. 21 is a flow chart for describing detailed operations of the mobile station when the base station pilot channel is selected. FIG. 23 is an explanatory diagram for explaining operation routes of the detailed flow charts indicated in FIG. 21 and FIG. 22.

In FIG. 13, a CdmaOone portable telephone system 300 is arranged by employing a mobile station 301, a first base station 310, a first area 311, a second base station 320, a second area 321, a third base station 330, a third area 331, a switching station 340, an exchanging (repeating) station 350, a first telephone 361, a second telephone 362, and a third telephone 363. The mobile station 301 is located within the first area 311 where the mobile station 301 is communicatable with the first base station 310. As an area located adjacent to the first area 311 of the first base station 310, both the second area 321 and the third area 331 are located. The second base station 320 is present within the second area 321, and the third base station 330 is present within the third base area 331.

The first base station 310, the second base station 320, and the third base station 330 are connected to the switching station 340 via a communication line. The switching station 340 is connected to the exchanging station 350 corresponding to an exchanging station of a wired telephone. The exchanging station 350 is connected via a wired telephone line to the first telephone 361, the second telephone 362, and the third telephone 363, which are owned by subscribers of wired telephones. In an actual case, many other telephones are connected to the exchanging station 350, whereas many other adjacent areas and many other base stations are located in the first area 311, and constitute a peripheral area group and a peripheral base station group, respectively. Outside these peripheral area group and peripheral base station group, communication area groups and communication base station groups are furthermore located. These base stations are also connected to the switching station 340. Also, a large number of mobile stations are located in addition to the mobile station 301 in each of these areas.

FIG. 14 is a block diagram for indicating an arrangement of the first base station 310 shown in FIG. 13.

The first base station 310 is provided with a pilot channel signal generating unit 11, a sink channel signal generating unit 12, a Walsh code modulating unit 13, a paging channel data generating unit 14, a paging channel long PN code modulating unit 15, a speech input unit 16, a first speech process encoding unit 17, a first telephone communication channel long PN code modulating unit 18, a first short PN code modulating unit 19, a first carrier modulating unit 20, a first antenna unit 21, a second antenna unit 22, a reception decoding unit 23, an access channel data detecting unit 24, a preamble code detecting unit 27, a speech (voice) output unit 25, and a control unit 26. The first base station 310 transmits a plurality of paging channel signals, and signals from a plurality of telephones as electromagnetic waves, and also receives a plurality of access channels and a plurality of telephone communication signals sent from a plurality of mobile stations so as to control the respective mobile stations. Also, the first base station 310 transfers a telephone communication signal to a plurality of telephones.

FIG. 15 is a block diagram for showing an arrangement of the mobile station 301 indicated in FIG. 13. The mobile station 301 is arranged by employing a transmission/reception block 85 which includes: an access channel data generating unit 51, an access channel long PN code modulating unit 52, a first switching unit 53, a second short PN code modulating unit 54, a second carrier wave modulating unit 55, an antenna commonly-using unit 56, a third antenna unit 57, a microphone unit 58, a second speech process encoding unit 59, a preamble code generating unit 60, a second telephone communication channel long PN code modulating unit 61, a second carrier wave demodulating unit 62, a short PN code demodulating unit 63, a second switching unit 64, a Walsh "0" decoding unit 65, a pilot channel offset detecting unit 66, a Walsh "32" decoding unit 67, a sink channel data detecting unit 68, a paging channel Walsh code decoding unit 69, a paging channel long PN code decoding unit 70, a paging channel data detecting unit 71, a telephone communication channel Walsh code decoding unit 72, a telephone communication channel long PN code decoding unit 73, a speech process decoding unit 74, and a speaker unit 75. Also, this mobile station 301 is arranged by employing a logic control block 76 which contains a logic judging unit 77, a program memory unit 78, and a data memory unit 79. Further, this mobile station 301 is arranged by employing a peripheral block 86 which owns a key operation unit 80, a display unit 81, and a battery unit 82.

In the transmission/reception block 85, both a pilot channel signal and a sink channel signal, which are transmitted from a base station, are received so as to specify such a base station of a communication counter party, and in response to a mobile station calling signal in a paging channel and a calling signal sent from a mobile station in an access channel, a telephone communication line is set via the base station between a telephone set and the mobile station so that a telephone communication can be made. Also, while the logic control block 76 stores thereinto a control program, this logic control block 76 acquires information from the transmission/reception block 85, and outputs a necessary control signal to this transmission/reception block 85. The peripheral block 86 supplies electric power necessary for the above-described operations, and enters information required by a user, and also displays control conditions of the mobile station to the user.

Next, a description will now be made of various structural units which constitute the transmission/reception block 85, the logic control block 76, and the peripheral block 86. It should be understood that each of the respective units is not explained, but each of these blocks is described in descriptions of embodiment modes according to the present invention.

Subsequently, operations of the CdmaOne portable telephone system 300 will now be schematically explained with reference to FIG. 13 to FIG. 23. The mobile station 301 which constitutes the CDMA portable telephone system 300 indicated in FIG. 13 commences a telephone communication (telephone conversation) with respect to the first base station 310 of the first area 311 in which the mobile station 301 is located in accordance with the below-mentioned method.

First, signals transmitted from the first base station 310 to the mobile station 301 will now be explained. The pilot channel signal generating unit 11 indicated in FIG. 14 generates a pulse stream of "1" and "0" which are not modulated at a bit rate of 1.2288 Mbps, and then, this pulse stream is modulated based upon the Walsh "0" code by the Walsh code modulating unit 13. Also, the sink channel signal generating unit 14 generates sink channel data of 1.2 Kbps, and then this sink channel data is modulated based upon the Walsh "32" code by the Walsh code modulating unit 13. Also, the paging channel signal generating unit 19 generates a digital signal at bit rates of 2.4 Kbps to 9.6 Kbps for calling the mobile station 301. This digital signal is modulated based upon the long PN code by the paging channel long PN code modulating unit 15, and is furthermore modulated based upon the paging channel Walsh code by the Walsh code modulating unit 13.

A speech signal (voice signal) which is outputted from the first telephone 361 shown in FIG. 13 and sent via both the exchanging station 350 and the switching station 340 is supplied via the speech input unit 16 and the first speech process encoding unit 17 to the first telephone communication channel long PN code modulating unit 18, and then is modulated based upon the long PN code. This long-PN-code-modulated speech signal is modulated based on the telephone communication channel Walsh code by the telephone communication channel Walsh code modulating unit 13. In an actual case, there are plural portions of paging channel signals and portions of speech input signals, which are surrounded by a dot line of FIG. 14.

FIG. 16 is an explanatory diagram for explaining Walsh code modulating unit 13. There are 64 pieces of the Walsh codes in total. In a downstream line (namely, in a signal transfer line from base station to mobile station), the Walsh codes are employed in a channel identifications. A Walsh "0" code is used to identify a pilot channel; a Walsh "32" code is employed so as to identify a sink channel; and Walsh codes defined from a Walsh "1" code up to a Walsh "63" code except for the Walsh "32" code are used to identify a paging channel and a telephone communication channel.

FIG. 18 is an explanatory diagram for explaining a long PN code. In the downstream line, the long PN code is used so as to encrypt a signal. The pilot channel signal, the sink channel signal, a plurality of paging channel signals, and a plurality of speech signal, which are entered into the Walsh code modulating unit 13, are modulated based upon the Walsh codes corresponding thereto, respectively. These Walsh-code-modulated signals are synthesized with each other, and then the synthesized signal is inputted to the first short PN code modulating unit 19 so as to be modulated based on the short PN code.

FIG. 17 is an explanatory diagram for explaining the short PN code. In the downstream line, the short PN code is employed so as to identify a base station. Since the first base station 310, the second base station 320, and the third base station 330 utilize the previously explained Walsh codes in the channel identifications, the respective base stations use the same short PN codes in order to judge that a signal is transmitted from which base-station. As represented in FIG. 17, since these base stations use such short PN codes, the phases of which are shifted by 64 bits from each other, a mobile station may discriminate a base station from each other. This is called as an "offset".

The synthesized signal which has been modulated based upon the short PN code by the first short PN code modulating unit 19 is entered into the first carrier wave modulating unit 20 so as to be carrier-modulated, and thereafter, this carrier-modulated signal is radiated as electromagnetic waves from the first antenna unit 21.

Next, operations of a mobile station will now be described. In the below-mentioned explanations, it should be understood that the mobile station 301 and the first base station 310 are merely referred to as a "mobile station" and a "base station", and will be clearly defined as the "mobile station 301" and the "first base station 310" in a specific case, if necessary.

As shown in FIG. 20, operation stages are segmented into the below-mentioned four states, while these operation stages are defined by that after a power supply of a mobile station is turned on, the mobile station commences a telephone communication via a base station to a telephone subscriber, and continues the telephone communication until an end of the telephone communication:

Step S100: Initialization state,
step S200: Idle state,
Step S300: Access state, and
Step S400: Control on the traffic channels state.

FIG. 21 and FIG. 22 indicate further detailed operation steps of the respective states, and FIG. 23 shows operation routes of the respective operation steps.

First, in a step S1, a power supply of the mobile station is turned ON. When a user depresses a key corresponding to the turn-ON operation of the key operation unit 80 shown in FIG. 15, voltages of a battery unit 82 are applied to the respective units in response to an instruction of the logic control block 76. It is so assumed that the mobile station does not employ an analog type portable telephone system, but employs such a mobile telephone system which is exclusively designed for the CdmaOne system. In a step S2, the mobile station sets a wireless frequency number (radio frequency number) which has been stored in the own mobile station. Precisely speaking, both a transmission frequency and a reception frequency, which correspond to the wireless frequency number stored in the data memory unit 79 of the logic control block 76, are set to both the second carrier wave modulating unit 55 and the carrier wave demodulating unit 61.

In a step S3, the second switching unit 64 is switched to the side of the Walsh "0" decoding unit 65 in response to an instruction issued from the logic control block 76, and then, the process operation is advanced to a step S4. In this step S4, a pilot signal is supplied via the third antenna unit 57, the antenna commonly-used unit 56, and the carrier wave demodulating unit 62 to the short PN code demodulating unit 63 so as to be demodulated by this short PN code demodulating unit 63, and then, the output of this short PN code demodulating unit 63 is fed to the Walsh "0" decoding unit 65. In the Walsh "0" decoding unit 65, this output signal is furthermore decoded by employing the Walsh "0" code so as to seek a pilot channel having the highest signal strength, and then, the process operation is advanced to a step S5.

In the step S5, a pilot channel offset detecting unit 66 detects an offset of the short PN code, and then, the process operation is advanced to a step S6. It should also be noted that the offset number of the PN code could not be detected at this stage. Also, in the case that the offset of the short PN code cannot be detected but the reception of the pilot channel fails, the process operation is returned to the step S2. In this step S2, both a wireless transmission frequency and a wireless reception frequency, which correspond to another wireless frequency number stored in the data memory unit 79, are again set to the second carrier wave modulating unit 55 and the carrier wave demodulating unit 62, and then, the above-described operation is repeatedly carried out.

In a step S6, the second switching unit 64 is switched to the side of the Walsh "32" decoding unit 67 in response to an instruction issued from the logic control block 76 so as to receive a signal of a sink channel sent from the base station. In other words, as to the signal which has been demodulated by the carrier wave demodulating unit 62 and the short PN code demodulating unit 63, only the sink channel corresponding thereto is detected by the Walsh "32" decoding unit 67 from this signal, and then, the detected sink channel is supplied to the sink channel data detecting unit 68. In a step S7, in such a case that the data of the sink channel can be decoded in the above-described process operations, the process operation is advanced to a step S8. To the contrary, in the case that the data of the sink channel cannot be decoded, the process operation is returned to the step S3.

In the step S8, the sink channel data detecting unit 68 acquires the below-mentioned information, and then stores the acquired information into the data memory unit 79:

1) Protocol altered level of base station,
2) minimum protocol altered level supported by base station,
3) network identification code,
4) offset number of PN sequence of base station pilot channel,
5) state of long PN code,
6) system time, and
7) data rate of paging channel.

The mobile station grasps an offset number of a PN sequence of a pilot channel of a base station based upon the above-described information 4), and correctly recognizes that which base station is received.

In a step S9, a check is made as to whether or not the protocol level of the mobile station is higher than, or equal to the minimum level supported by the base station based upon the information acquired in the sink channel. If the check result becomes "No", then the process operation is returned to the step S2. If the check result becomes "Yes", then the process operation is advanced to a step S10. In the step S10, while both the information 5) "state of long PN code" and the information 6) "system time" acquired in the step S8 are employed, and also a content of the long PN code and timing information thereof transmitted from the base station are utilized, both a long PN code and timing thereof are set which are used in both the paging channel long PN code decoding unit 70 and the telephone communication channel long PN code decoding unit 73.

In a step S11, the second switching unit 63 is switched to the side of the paging channel Walsh code decoding unit 68 in response to an instruction issued from the logic control block 76, and then, data rate and the like are set from a code number of a paging channel based upon the information acquired in the sink channel in the step S8, and also, a paging channel signal transmitted from the base station is received. In other words, as to the signal which are demodulated by the carrier demodulating unit 61 and the short PN code decoding unit 62, only a paging channel corresponding to the paging channel Walsh code is detected, and is furthermore decoded by the paging channel long PN code decoding unit 69. That is to say, the data of the paging channel is decoded by employing the long PN code whose timing has been adjusted in the step S10, and then, the decoded data output is supplied to the paging channel data detecting unit 71. Then, this paging channel data detecting unit 71 acquires data related to a peripheral base station and a remaining base station, and then stores this data into the data memory unit 79. The process operation is advanced to a step S12.

The above-explained steps S1 to S11 correspond to the step S100 (namely, initialization state) shown in FIG. 20.

In a step S12, reception strengths of pilot channels of the respective base stations of the peripheral base station list and the remaining base station list are measured for a time duration until a telephone communication is commenced during waiting time period. Based upon the measurement results, the reception strengths of the pilot channels of the respective base stations are described in both the peripheral base station list and the remaining base station list so as to alter these lists, and then the process operation is advanced to a step S13. In this step S13, a check is made as to whether or not a reception signal strength of the present base station is lower than the minimum receivable signal length. Since the mobile station is moved even during the waiting time period, there is a certain possibility that the reception signal strength of the present base station becomes lower than the minimum receivable signal strength. When this reception signal strength becomes below than the minimum receivable signal strength, the process operation is advanced to a step S14. To the contrary, when the reception signal strength is not lower than the minimum receivable signal strength, the process operation is advanced to a step S16.

In the step S14, a check is made as to whether or not such a base station having a paging channel whose reception level is higher than the minimum receivable signal strength is present in the peripheral base station list. When such a base station is not present in the peripheral base station list, the process operation is advanced to the step S3. On the other hand, when such a base station is present in the peripheral base station list, the process operation is advanced to a step S15. In this step S15, a selection is made of a paging channel of a base station which contains an offset number of a pilot channel whose reception strength become maximum (note that offset number of pilot channel will be simply referred to as "offset number" hereinafter) from the peripheral base station list, and then, the process operation is returned to the step S12.

In the case that the reception sensitivity is not lowered in the step S13, the process operation is advanced to a step S16. In the step S16, a check is made as to whether or not a telephone call is issued from the base station in the paging channel. When the telephone call is issued from the base station, the process operation is advanced to a step S18. On the other hand, in the case that the telephone call is not issued from the base station, the process operation is advanced to a step S17. In this step S17, a check is made as to whether or not a telephone call is issued from the mobile station to the base station. When the telephone call is issued, the process operation is advanced to a step S18. To the contrary, when the telephone call is not issued from the mobile station to the base station, the process operation is returned to the previous step S16.

The above-explained steps S12 to S17 correspond to the above-described step S200 (waiting state) shown in FIG. 20. In an actual case, there are other operations that the mobile station is identified and registered in the base station system in addition to the above-explained operations. However, since these operations have no direct relation to the explanations as to the operations of the present invention, these other operations are omitted.

In a step S18, there are two cases, namely in the case that the telephone call is issued from the base station in the step S16, and in the case that the telephone call is issued from the mobile station to the base station in the step S17, a communication is established to the base station by employing an access channel in any one of these two cases. Then, the process operation is advanced to a step S19. Precisely speaking, an access channel data generating unit 51 generates either data indicating that the mobile station receives a telephone call issued from the base station, or data representing that a telephone call is issued from the mobile station, and this generated data is modulated based upon the access channel long PN code by the access channel long PN code modulating unit 52, and then, this modulated data is supplied via the first switching unit 53 to the second short PN code modulating unit 54 so as to be modulated based upon the short PN code. This short-PN-code-modulated data is converted into a carrier wave by the second carrier wave modulating unit 55, and then is supplied via the antenna commonly-used unit 56 so as to be radiated as electromagnetic waves from the third antenna unit 57, so that a signal is transmitted to the base station. As indicated in FIG. 19, in an upstream line, the long PN code is used so as to discriminate the access channel from the telephone communication channel, and the short PN code is used in order to discriminate such that the mobile station is communicated with which base station.

Next, in a step S19, a check is made as to whether or not an instruction for starting a telephone communication is issued from the base station via the paging channel. When the instruction for starting the telephone communication is issued from the base station, the process operation is advanced to a step S20. On the other hand, in the step S20, a preamble code is transmitted to the base station via the telephone communication channel, while this preamble code is such a code for indicating that the mobile station receives the telephone communication starting signal of the base station. Then, the process operation is advanced to a step S21 in which the telephone communication is commenced.

Subsequently, the operations defined in the step S19, the step S20, and the step S21 will be explained in detail. In the step S18, the electromagnetic waves transmitted from the mobile station are received by the second antenna unit 22 of the base station, and then are detected via the reception decoding unit 23 by the access channel data detecting unit 24, and the access channel data detecting unit 24 grasps that the telephone call sent from the base station is detected by the mobile station, or grasps that the mobile station requests the base station to issue the telephone call, and then, informs this grasped content to the control unit 26. The control unit 26 informs this grasped content to the paging channel data generating unit 14. The paging channel data generating unit 14 radiates as electromagnetic waves from the first antenna unit 21, as previously explained, such an information for instructing the mobile station to start the telephone communication.

The electromagnetic waves radiated from the base station are received by the third antenna unit 57 of the mobile station. As previously explained, the paging channel data detecting unit 71 detects that the mobile station has been instructed from the mobile station to commence the telephone communication, and informs this information to the logic control block 76. The logic control block 76 informs this information to the preamble code generating unit 60, and at the same time, switches the first switching unit 53 to the side of the second telephone communication channel long PN code modulating unit 61, and also switches the second switching unit 64 to the side of the telephone communication channel Walsh code decoding unit 72. The preamble code of the preamble code generating unit 60 is modulated based upon the telephone communication channel long PN code by the second telephone communication channel long PN code modulating unit 61, as previously explained, and the modulated preamble code is radiated as the electromagnetic waves from the third antenna unit 57 toward the base station.

In this case, as a telephone communication channel long PN code used to discriminate a communication channel from each other, one of the long PN codes is employed. As indicated in FIG. 18, there are approximately 4.4 trillions of long PN codes, and since these 4.4 trillions of long PN codes may be separately allocated to the respective mobile stations, the base station need not designate a telephone communication channel, but merely instructs a mobile station to commence a telephone communication. Next, in the telephone communication operation defined in the step S21, the mobile station supplies the speech signal derived from the microphone unit 58 via the second speech process encoding unit 59 and the second telephone communication channel long PN code modulating unit 61, and as previously described, radiates the processed speech signal as the electromagnetic waves from the third antenna unit 57 toward the base station.

The electromagnetic waves radiated from the mobile station are received from the second antenna unit 22 of the base station, the speech signal transmitted from the mobile station is outputted via the reception decoding unit 23 by the speech output unit 25, and then, this speech signal is sent via the switching station 340 and the exchanging station 350 to the first telephone 361. On the other hand, the speech signal derived from the first telephone 361 is transferred via the exchanging station 350 and the switching station 340 to the speech input unit 16. As previously explained, this speech signal is radiated as electromagnetic waves from the first antenna unit 21 toward the mobile station. The electromagnetic waves are received by the third antenna unit 57, and as previously explained, are supplied via the antenna commonly-used unit 56, the second carrier wave demodulating unit 62, the short PN code demodulating unit 63, the second switching unit 64, the telephone communication channel Walsh code decoding unit 72, and the telephone communication channel long PN code decoding unit 73 to the speech process decoding unit 74, and then, the speech signal is transferred to the user of the mobile station by the speaker unit 75.

Finally, in a step S22, a check is made as to whether or not a telephone communication has been accomplished. When the telephone communication has not yet been completed, the process operation is returned to the step S21 in which the telephone communication is continued. On the other hand, when the telephone communication has been completed, the process operation is returned to the step S12.

The above-described steps S20 to S22 correspond to the step S400 (control on the traffic channels state) of FIG. 20. In an actual case, the signal confirmation operations are carried out two times in a reciprocation manner between the mobile station and the base station by employing the designated communication channel in a process step between the step S20 and the step S21. In the case that a telephone call is issued from the mobile station, a telephone number of a communication counter party is transmitted to the base station within the offset thereof. Since these operations are not related to the descriptions as to the operations of the present invention, explanations thereof are omitted.

It should be understood that while sequential operations related to the above-explained operations have been stored in the program memory unit 78, the sequential operations are sequentially read out therefrom in response to operations to the logic judging unit 77 for the execution purposes. Also, the display unit 81 may function as a means for notifying conditions to the user in correspondence with the respective operations, and the key operation unit 80 is used to enter a request of the user into the logic judging unit 77 in correspondence with the respective operations.

SUMMARY OF THE INVENTION

In the above-described conventional CdmaOne portable telephone system, in the flow process step S19 in which the mobile station commences the telephone communication with the telephone subscriber via the base station, there is such a case that the mobile station cannot receive the instruction for starting the telephone communication issued from the base station via the paging channel. This reason is given as follows. That is, in the step S18, such a case is conceivable in which the signal transmitted from the mobile station via the access channel cannot be reached to the base station. The selection of the base station by the mobile station is carried out in the below-mentioned manner. That is, such a base station is selected in which the reception level of the electromagnetic waves transmitted from the base station to the mobile station by using the downstream line becomes maximum. However, the base station selected in this manner does not always constitute such a base station capable of receiving the electromagnetic waves under best reception condition, which are transmitted from the mobile station to the base station by employing the upstream line.

In other words, while the downstream line and the upstream line use the electromagnetic waves having the frequencies which are mutually separated from each other, since the reception performance of the respective base stations is not identical to each other, the following condition cannot be always established. That is, a base station in which the best reception condition as to the mobile station can be obtained in the downstream line cannot always receive the signal of the mobile station under best reception condition also in the upstream line. As a consequence, there is no specific problem in such a case that the mobile station is located near the base station. However, when this mobile station is moved to the peripheral portion of the communication area of the base station, and thus the reception field strength of the electromagnetic waves sent from the base station is decreased, such a problem may occur. That is, the signal transmitted from the mobile station cannot be reached to the base station via the access channel, so that the telephone communication cannot be made. Otherwise, lengthy time is required until the telephone communication line can be established.

In the case that the instruction of the telephone communication sent from the base station is received in the step S19 and then the telephone communication is carried out, the telephone communication is ended in the step S22, the process operation is returned to the step S12 in which the mobile station is brought into the waiting state, and then, it is so judged in the step S13 that the reception field strength is lowered, the process operation is returned to either the step S3 or the step S12, and in the succeeding steps, such a case may occur. That is, in the succeeding steps, such a base station may be probably selected which does not correspond to the base station which has received the instruction of the telephone communication from the base station to execute the telephone communication in the step S19. In such a case, due to the above-explained reason, the following problems may occur. That is, there are certain possibilities that when the signal is transmitted from the mobile station to the base station in the access channel in order to perform the telephone communication next time, this signal cannot be reached to the base station. As a result, the telephone communication cannot be carried out, or lengthy time is required until the communication line is established.

In the descriptions of the above-explained prior art, since the description becomes complex, this description has been omitted. However, when the mobile station is moved to the peripheral portion of the communication area of the base station and thus the reception field strength of the electromagnetic waves transmitted from the base station is decreased, the mobile station executes the communication operation not only with the base station in the area where this mobile station is presently located, but also either one or two base stations located at the peripheral area (namely, diversity reception). When the telephone communication is accomplished at this time, such a base station that the reception power becomes maximum is selected from a plurality of base stations with which the mobile station has communicated, and then the process operation is returned to the step S12. As a result, there are some possibilities that this selected base station is not equal to such a base station which has received the instruction of the telephone communication sent from the base station to execute the telephone communication in the step S19. In such a case, due to the above-explained reasons, the following problems may occur. That is, there are certain possibilities that when the signal is transmitted from the mobile station to the base station in the access channel in order to perform the telephone communication next time, this signal cannot be reached to the base station. As a result, the telephone communication cannot be carried out, or lengthy time is required until the communication line is established.

The present invention has been made to solve the above-described problems, and therefore, has an object to provide a CDMA portable telephone apparatus capable of quickly selecting a base station which may constitute a communication counter party when a telephone communication is commenced.

To achieve the above-described object, a CDMA portable telephone apparatus, according to the present invention, is featured by such a CDMA portable telephone apparatus comprising: transmission/reception means; logic control means; and failure-base-station storage means; wherein: while the logic control means selects one base station from a plurality of base stations via the transmission/reception means so as to set a telephone communication line, in such a case that no response is issued from the selected base station and setting of the telephone communication line fails, the logic control means stores the selected base station into the failure-base-station storage means; and in a next selecting operation for a base station, the logic control means excludes the selecting operation of the base station stored in the failure-base-station storage means. As a consequence, since the base station which constitutes the communication counter party can be quickly selected, the establishment of the telephone communication line can succeed within a short time.

Also, in the CDMA portable telephone apparatus according to the present invention, the failure-base-station storage means of the CDMA portable telephone apparatus is comprised of: base station offset number storage means for storing thereinto an offset number of a pilot channel of a base station; and counter means; in the case that no response is issued from a selected base station and setting of a communication line fails, the logic control means stores an offset number of the selected base station into the base station offset number storage means, and sets a predetermined value to the counter means; and in a next selecting operation for a base station, when the logic control means again selects the base station stored in the base station offset number storage means, the logic control means decrements the value of the counter means by 1 and again executes a selecting operation for a base station.

Also, a CDMA portable telephone apparatus according to the present invention is featured by such a CDMA portable telephone apparatus comprising: transmission/reception means; logic control means; and success-base-station storage means; wherein: while the logic control means selects one base station from a plurality of base stations via the transmission/reception means so as to set a telephone communication line, in the case that a telephone communication start instructing signal is received from the selected base station and setting of the communication line succeeds, the logic control means stores the selected base station into the success-base-station storage means; and in a next selecting operation for a base station, in such a case that no response is issued from the selected base station and setting of the telephone communication line fails, if the selected base station is different from the base station stored in the success-base-station storage means, then the logic control means sets to select the base station stored in the success-base-station storage means, and again executes a selecting operation for a base station.

Also, in the CDMA portable telephone apparatus according to the present invention, the CDMA portable telephone apparatus is further comprised of: success-base-station storage means; and while the logic control means selects one base station from a plurality of base stations via the transmission/reception means so as to set a telephone communication line, in the case that a telephone communication start instructing signal is received from the selected base station and setting of the communication line succeeds, the logic control means stores the selected base station into the success-base-station storage means; and in a next selecting operation for a base station, while the logic control means selects one base station from a plurality of base stations so as to set a telephone communication line, in such a case that no response is issued from the selected base station and setting of the telephone communication line fails, if the selected base station is different from the base station stored in the success-base-station storage means, then the logic control means sets to select the base station stored in the success-base-station storage means, and again executes a selecting operation for a base station.

Furthermore, in the CDMA portable telephone apparatus according to the present invention, while the logic control means selects one base station from a plurality of base stations via the transmission/reception means so as to set a telephone communication line, in such a case that no response is issued from the selected base station and setting of the telephone communication line fails, if the selected base station is made coincident with the base station stored in the success-base-station storage means, then the logic control means deletes the storage content of the success-base-station storage means. As a consequence, since the base station which constitutes the communication counter party can be quickly selected, the establishment of the telephone communication line can succeed within a short time.

BRIEF DESCRIPTION OF THE DRAWINGS

FIG. 7 is a continued flow chart portion of the detailed flow chart shown in FIG. 6.

FIG. 11 is a continued flow chart portion of the detailed flow chart shown in FIG. 10.

FIG. 12 is an explanatory diagram for explaining an operation route of the detailed flow chart of FIG. 10.

FIG. 16 is an explanatory diagram for explaining the Walsh codes of the prior art.

FIG. 17 is an explanatory diagram for explaining the short PN codes of the prior art.

FIG. 18 is an explanatory diagram for explaining the long PN codes of the prior art.

FIG. 19 is an explanatory diagram for explaining use conditions of the Walsh codes, the short PN codes, and the long PN codes in the conventional CdmaOne portable telephone system.

Figure 1:
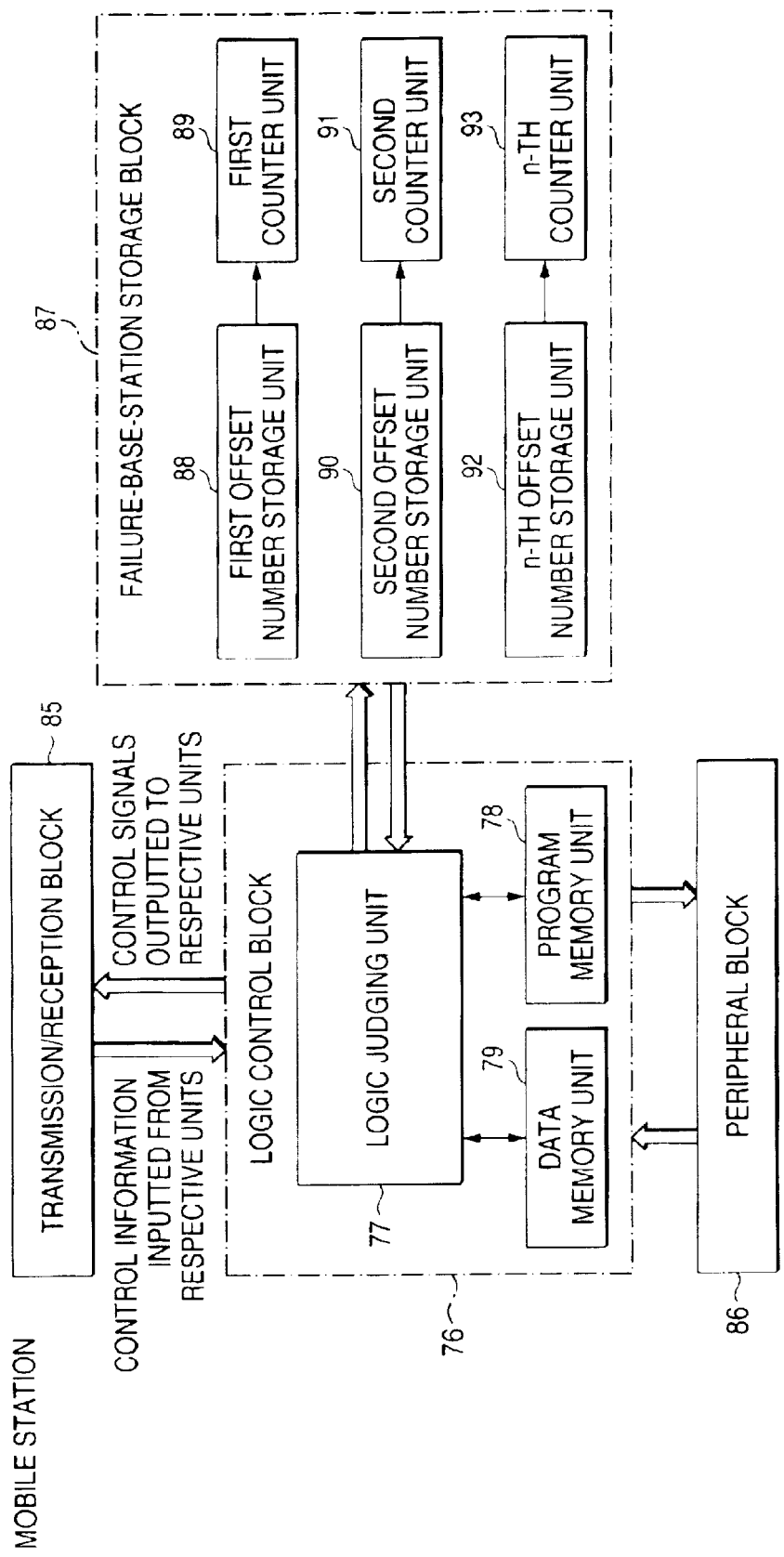
FIG. 1 is a block diagram for indicating a CDMA portable telephone apparatus (mobile station) according to is a first embodiment mode of the present invention.

It should be noted that in the drawings, reference numeral 11 shows a pilot channel signal generating unit; reference numeral 12 indicates a sink channel signal generating unit; reference numeral 13 represents a Walsh code modulating unit; reference numeral 14 denotes a paging channel data generating unit; reference numeral 15 is a paging channel long PN code modulating unit; reference numeral 16 shows a speech input unit; reference numeral 17 indicates a first speech process encoding unit; reference numeral 18 represents a first telephone communication channel long PN code modulating unit; reference numeral 19 denotes a first short PN code modulating unit; reference numeral 20 represents a first carrier wave modulating unit; reference numeral 21 indicates a first antenna unit; reference numeral 22 is a second antenna unit; reference numeral 23 shows a reception decoding unit; reference numeral 24 denotes an access channel data detecting unit; reference numeral 25 indicates a speech output unit, reference numeral 26 shows a control unit; reference numeral 27 denotes a preamble code detecting unit; reference numeral 51 shows an access channel data generating unit; reference numeral 52 denotes an access channel long PN code modulating unit; reference numeral 53 shows a first switching unit; reference numeral 54 denotes a second short PN code modulating unit; reference numeral 55 represents a second carrier wave modulating unit; reference numeral 56 indicates an antenna commonly-used unit; reference numeral 57 shows a third antenna unit; reference numeral 58 represents a microphone unit; reference numeral 59 shows a second speech process encoding unit; reference numeral 60 denotes a preamble code generating unit; reference numeral 61 represents a second telephone communication channel long PN code modulating unit; reference numeral 62 shows a second carrier wave demodulating unit; reference numeral 63 represents a short PN code demodulating unit; reference numeral 64 is a second switching unit; reference numeral 65 shows a Walsh "0" decoding unit; reference numeral 66 indicates a pilot channel offset detecting unit; reference numeral 67 represents a Walsh "32" decoding unit; reference numeral 68 shows a sink channel data detecting unit; reference numeral 69 indicates a paging channel Walsh code decoding unit; reference numeral 70 shows a paging channel long PN code decoding unit; reference numeral 71 is a paging channel data detecting unit; reference numeral 72 indicates a telephone communication channel Walsh code decoding unit; reference numeral 73 indicates a telephone communication channel long PN code decoding unit; reference numeral 74 represents a speech process decoding unit; reference numeral 75 shows a speaker unit; reference numeral 76 is a data memory unit; reference numeral 77 indicates a logic judging unit; reference numeral 78 denotes a program memory unit; reference numeral 79 is a data memory unit; reference numeral 80 shows a key operation unit; reference numeral 81 indicates a display unit; reference numeral 82 represents a battery unit; reference numeral 84 indicates a success-base-station storage unit; reference numeral 85 represents a transmission/reception block; reference numeral 86 denotes a peripheral block; reference numeral 87 is a failure-base-station storage block; reference numeral 88 indicates a first offset number storage unit; reference numeral 89 shows a first counter unit; reference numeral 90 denotes a second offset number storage unit; reference numeral 91 indicates a second counter unit; reference numeral 92 represents an n-th offset number storage unit; reference numeral 93 denotes an n-th counter unit; reference numeral 300 is a portable telephone system; reference numeral 301 shows a mobile station; reference numeral 310 denotes a first base station; reference numeral 311 represents a first area; reference numeral 320 shows a second base station; reference numeral 321 shows a second area; reference numeral 330 indicates a third area; reference numeral 361 represents a first telephone; reference numeral shows a second telephone; and also reference numeral 363 indicates a third telephone.

DETAILED DESCRIPTION OF THE PREFERRED EMBODIMENTS

As to preferred embodiment modes of CDMA portable telephone apparatus according to the present invention, a detailed description will now be made of [first embodiment mode], [second embodiment mode], and [third embodiment mode] in this order with reference to FIG. 1 to FIG. 12.

[First Embodiment Mode]

FIG. 1 is a block diagram for representing a CDMA portable telephone apparatus (will be referred to as a "mobile station" hereinafter) according to a first embodiment mode of the present invention. In this drawing, the mobile station according to the first embodiment mode is arranged by employing a transmission/reception block 85, a logic control block 76, a peripheral block 86, and a failure-base-station storage block 87. The transmission/reception block 85 corresponds to a transmission/reception means described in a scope of claim. The logic control block 76 corresponds to a logic control means which contains a logic judging unit 77, a program memory unit 78, and a data memory unit 79. The failure-base-station storage block 87 corresponds to a failure-base-station storage means. This failure-base-station storage block 87 contains a first offset number storage means 88, a second offset number storage unit 90, and an n-th offset number storage unit 92, which correspond to a base station offset number storage means; and a first counter unit 89, a second counter unit 91, and an n-th counter unit 93, which correspond to a counter means.

Figure 15:
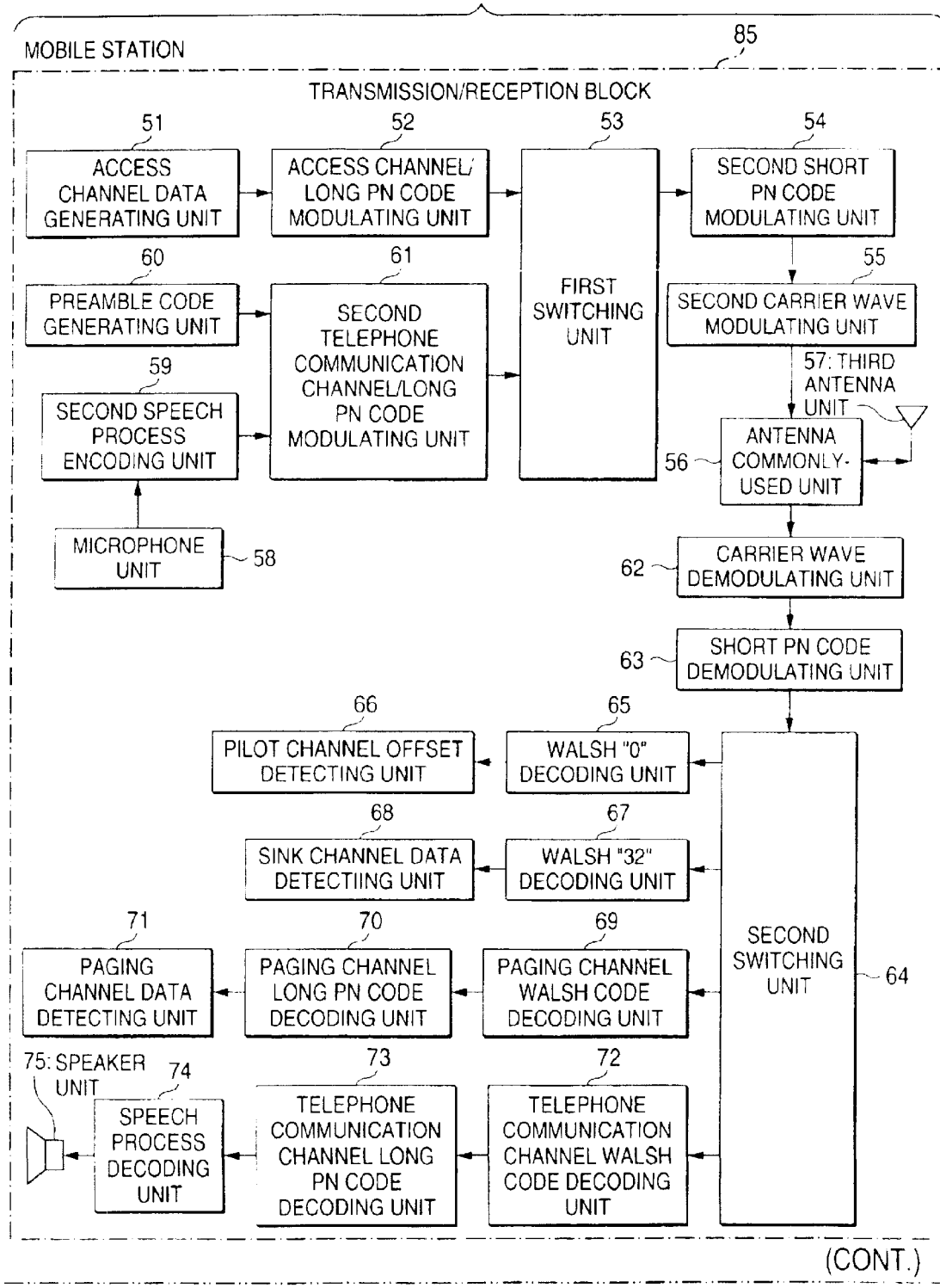
FIG. 15 is a block diagram for showing the arrangement of the conventional mobile station.
Figure 20:
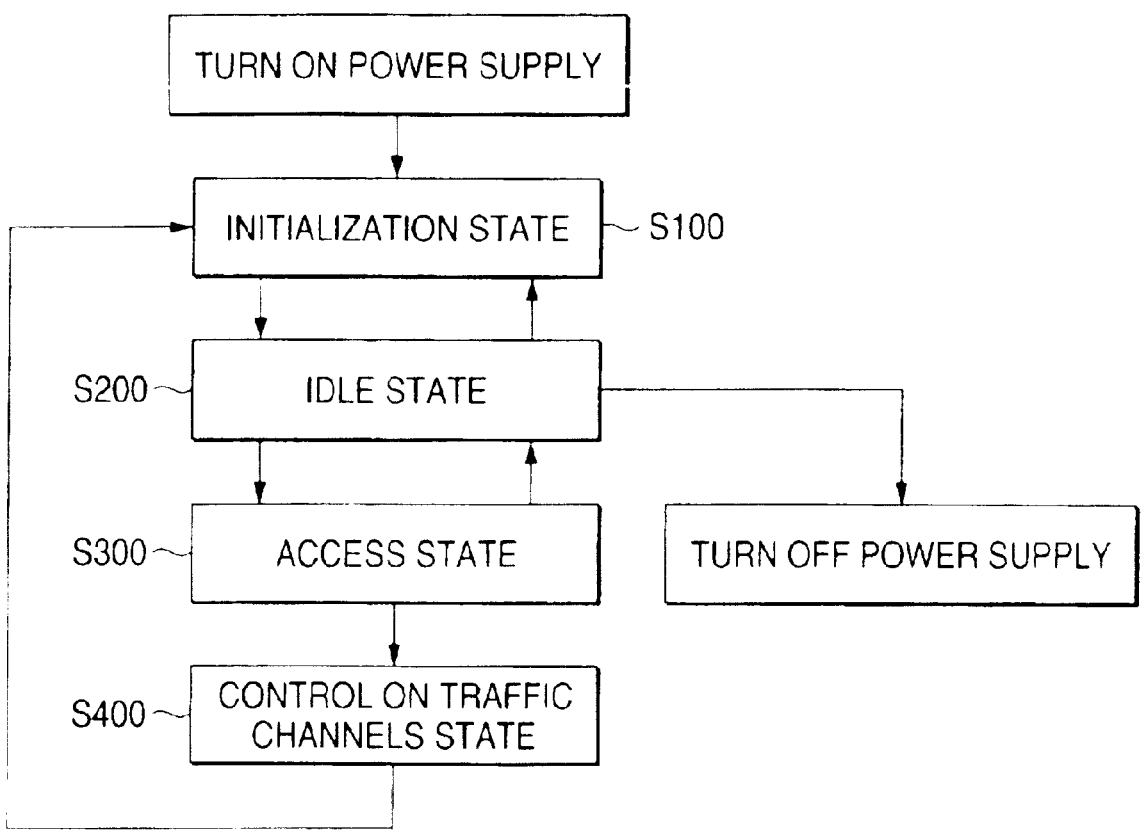
FIG. 20 is a schematic flow chart for describing the operations executed in that the mobile station selects the base station in the prior art.

It should also be noted that the same reference numbers shown in FIG. 15 (prior art) will be employed for denoting the same structural units shown in FIG. 1, and explanations thereof are omitted. The mobile station of this first embodiment mode indicated in FIG. 1 owns a different point from the conventional mobile station indicated in FIG. 15 such that the failure-base-station storage block 87 is additionally provided. The failure-base-station storage block 87 includes a preselected number of offset number storage units 88, 90, 92, which store thereinto offset numbers of base stations, and also, a preselected number of counter units 89, 91, 93, which store thereinto predetermined count values.

Figure 2:
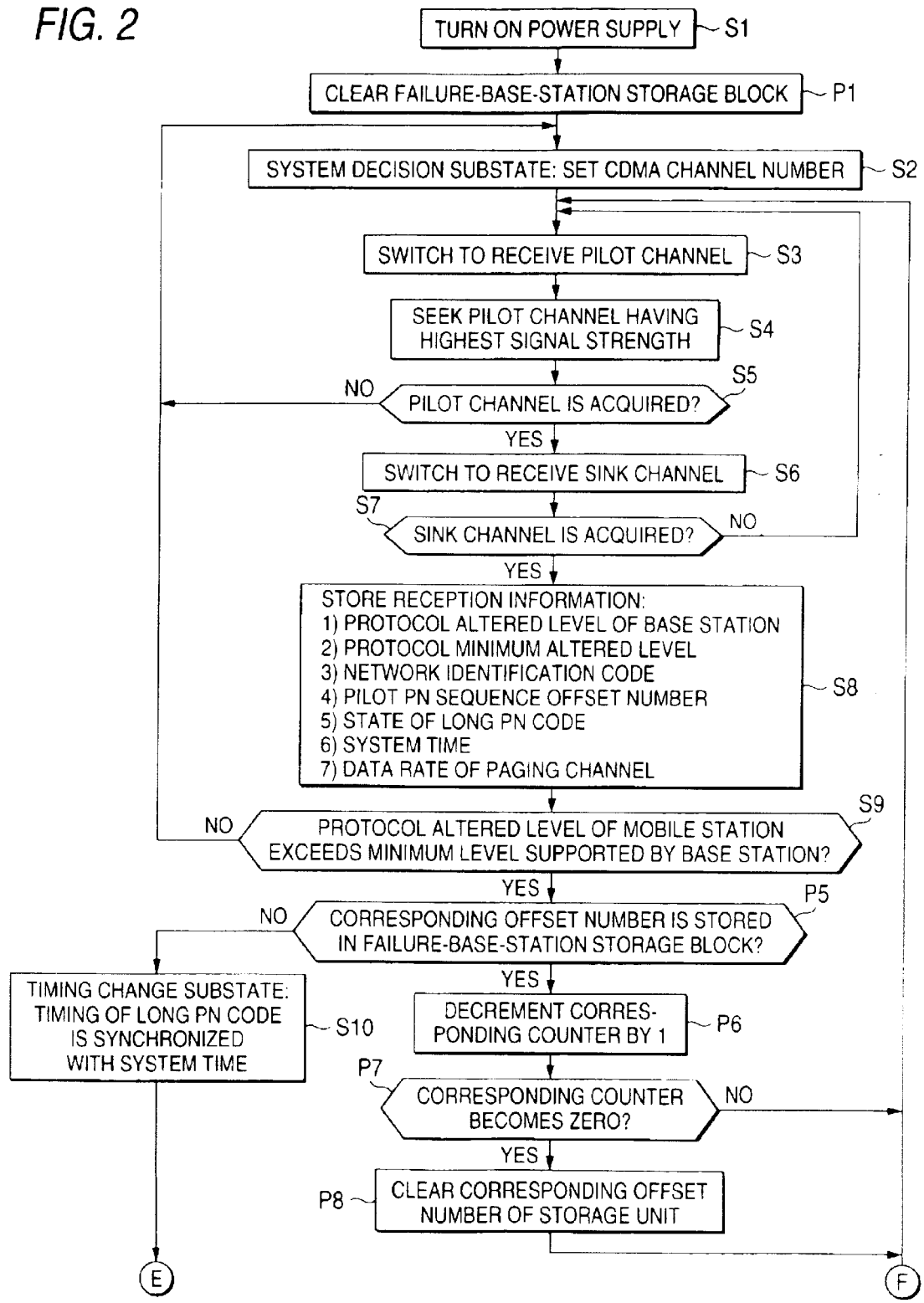
FIG. 2 is a detailed flow chart for explaining operations executed in that the mobile station of the first embodiment mode selects a base station.
Figure 3:
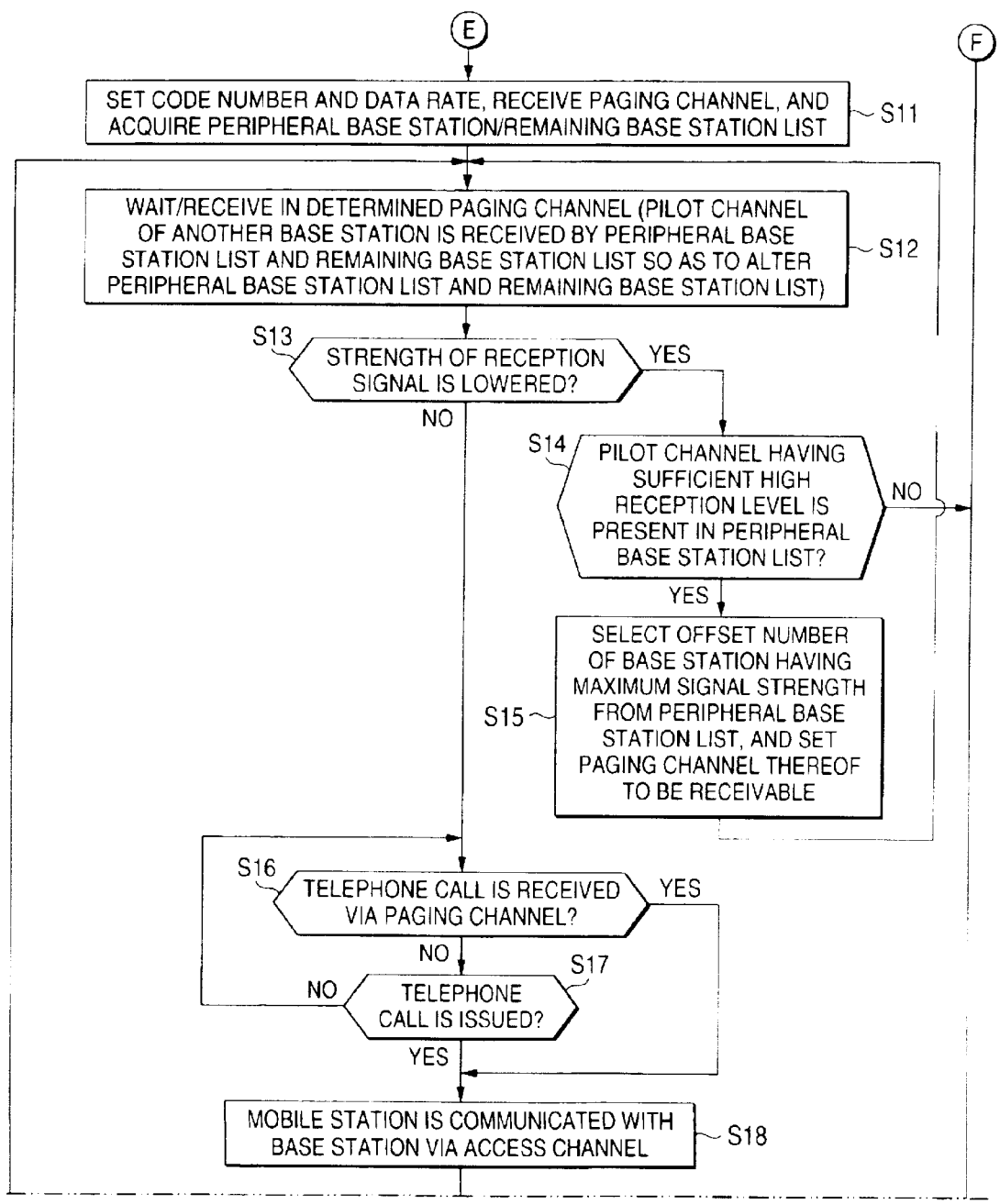
FIG. 3 is a continued flow chart portion of the detailed flow chart shown in FIG. 2.
Figure 4:
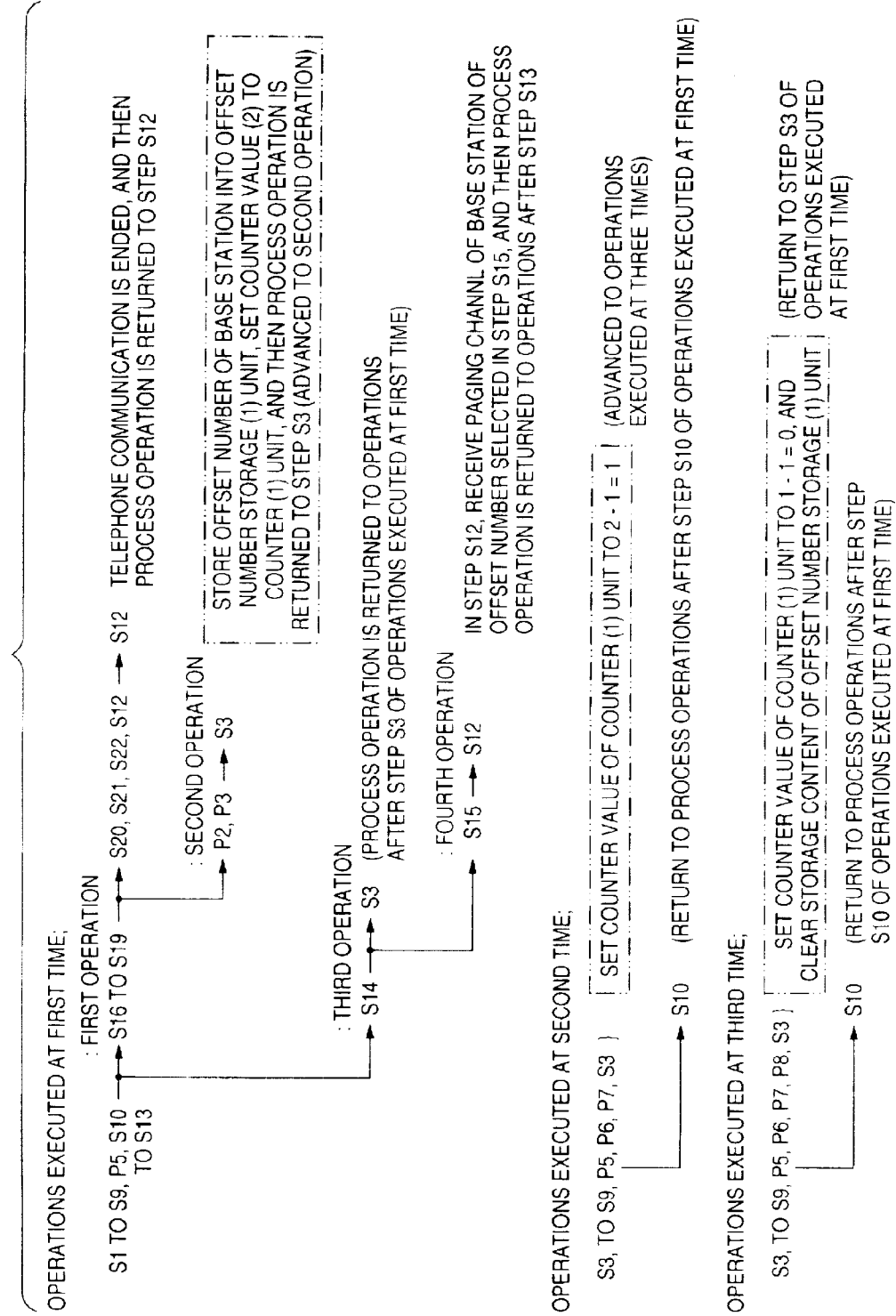
FIG. 4 is an explanatory diagram for explaining an operation route of the detailed flow chart of FIG. 2.
Figure 21:
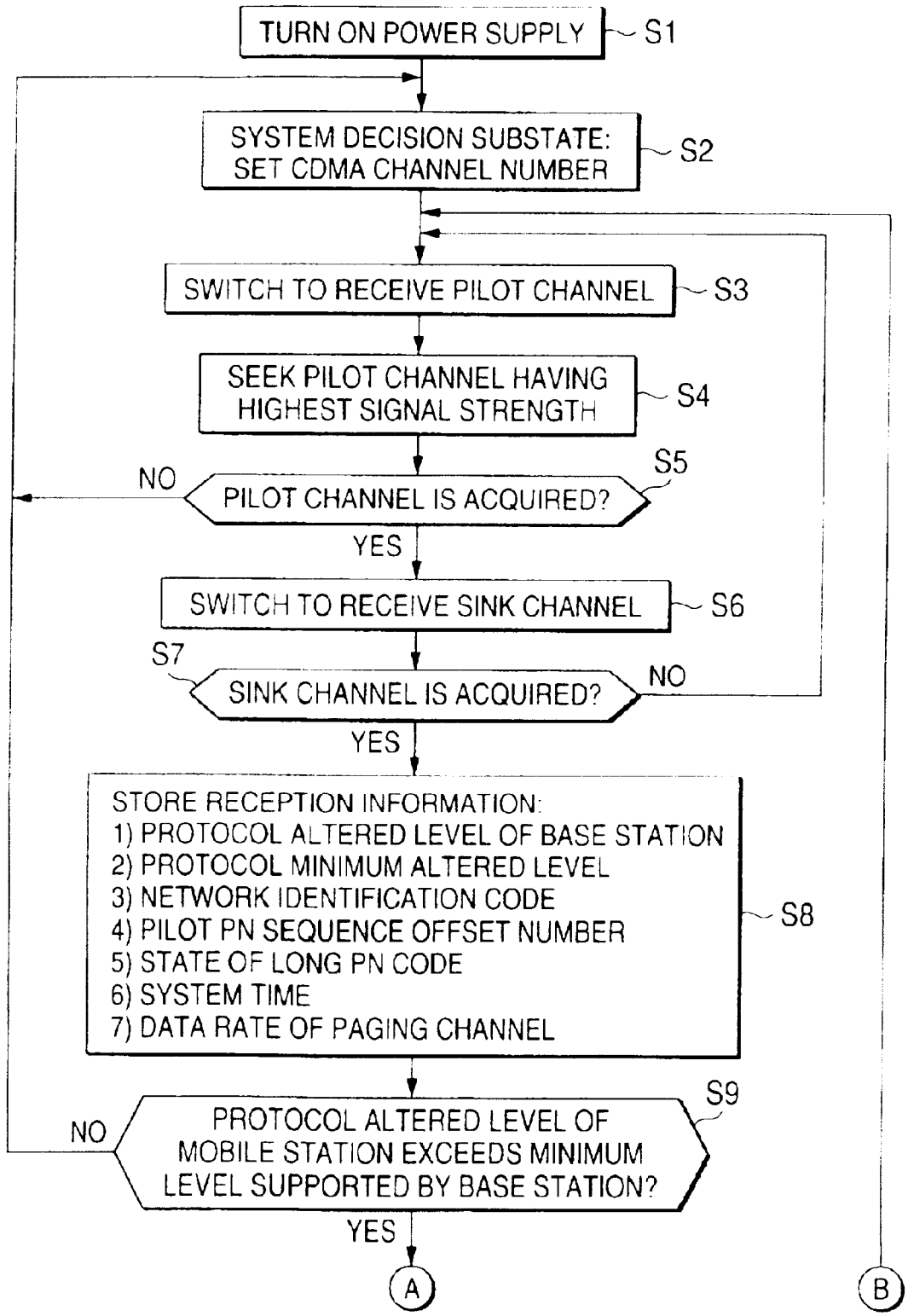
FIG. 21 is a detailed flow chart for explaining the operations executed in that the mobile station selects the base station in the prior art.
Figure 22:
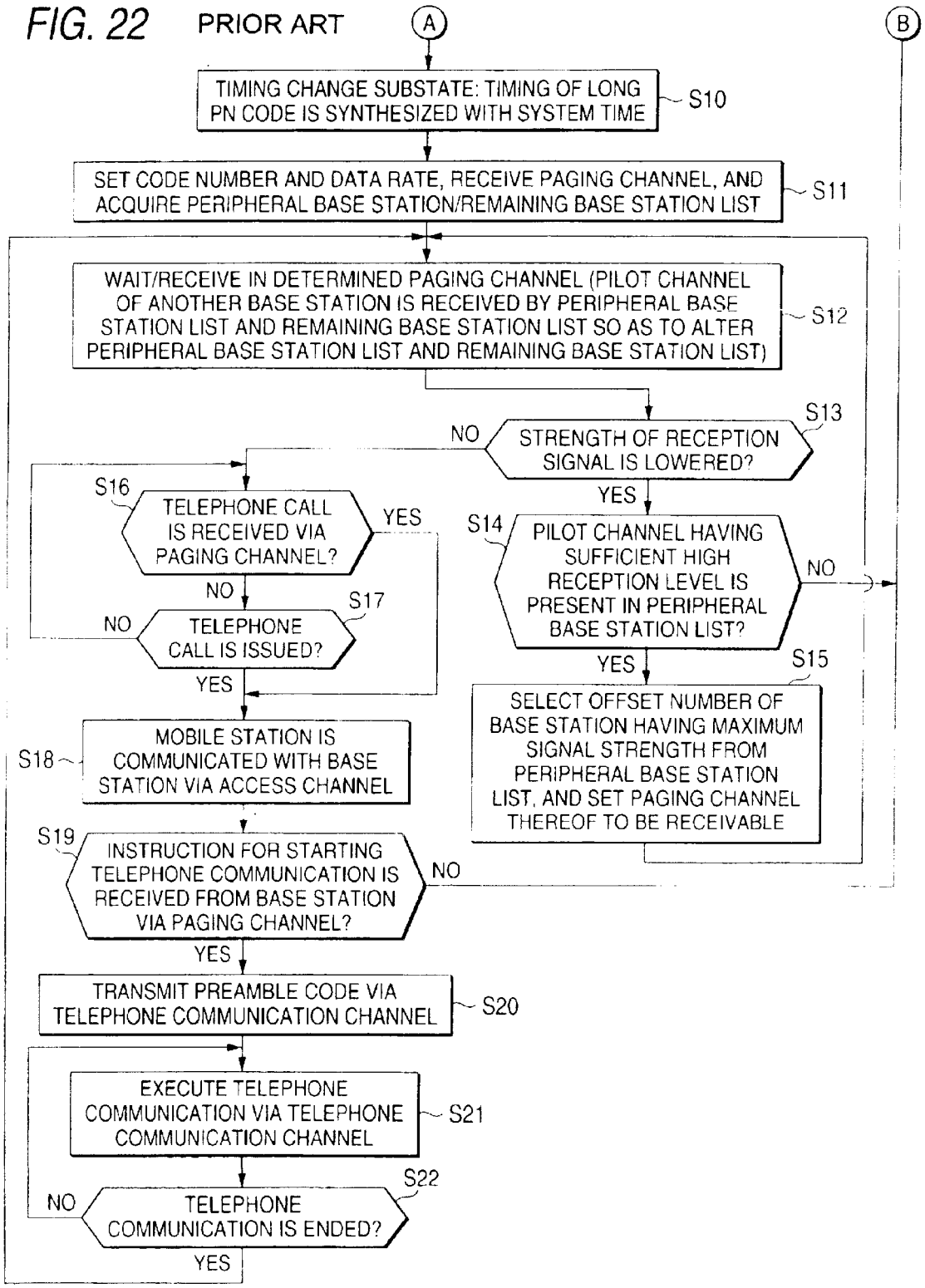
FIG. 22 is a continued flow chart portion of the detailed flow chart shown in FIG. 21.
Figure 23:
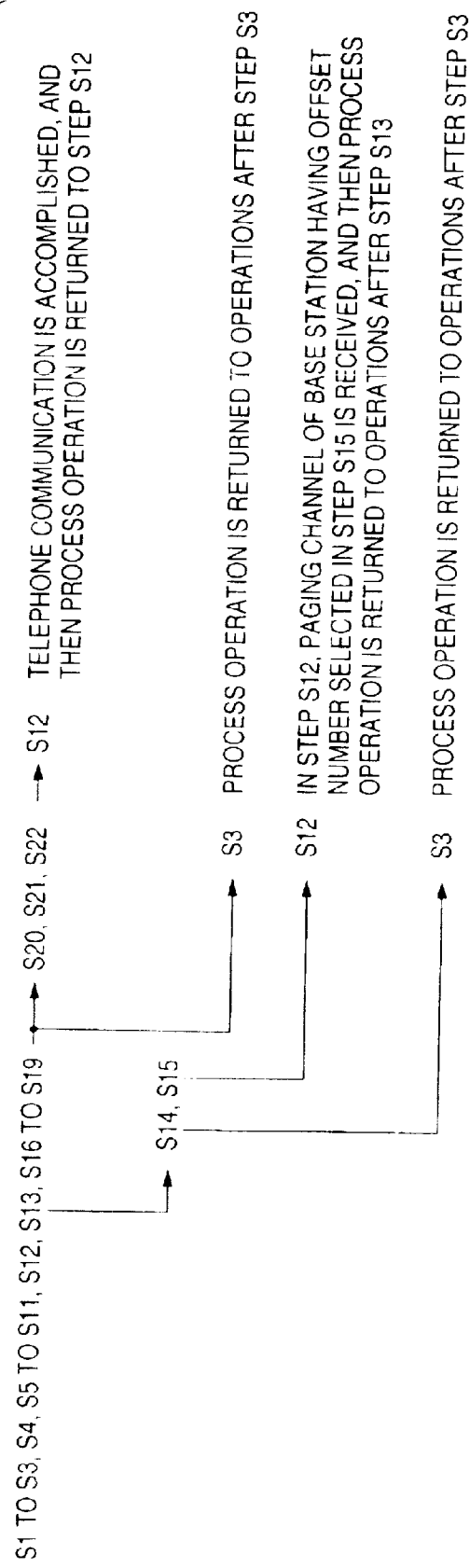
FIG. 23 is an explanatory diagram for explaining the operation route of the detailed flow chart of FIG. 21.

FIG. 2 and FIG. 3 are detailed flow charts for describing operations executed in that the mobile station of the first embodiment mode selects a base station. FIG. 4 is an explanatory diagram for explaining operation routes of the detailed flow charts of FIG. 2 and FIG. 3. Next, base station selecting operations according to the first embodiment mode will now be described with reference to FIG. 1, FIG. 2, FIG. 3, and FIG. 4. It should also be understood that since the steps S1 to S22 shown in FIG. 2 and FIG. 3 are identical to the operation steps of the prior art which have already been explained in FIG. 21 and FIG. 22, the same step numbers indicated in FIG. 21 and FIG. 22 (prior art) are employed to indicate these operation steps and explanations thereof are omitted.

Since steps P1 to P8 indicated in FIG. 2 and FIG. 3 correspond to process operations which are newly added in this embodiment mode in order to improve the conventional methods, the process operations of these steps P1 to P8 will be mainly explained.

A description is made of process operations executed at a first time. First, in a step S1, a power supply of the mobile station is turned ON. In the step P1, offset numbers are cleared which are stored in the first offset number storage unit 88, the second offset number storage unit 90, and the n-th offset storage unit 92 of the failure-base-station storage block 87, and also, counter values of the first counter unit 89, the second counter unit 91, and the n-th counter unit 89 are reset to zero. Then, the process operation is advanced to a step S2. A role of the failure-base-station storage block 87 will be explained in steps subsequent to the step P2.

Process operations defined from the step S2 to a step S9 are the same as those of the prior art. In a step P5, since an offset number may be grasped based upon the data acquired in the step S8 and a base station under communication may be recognized, a check is made as to whether or not this grasped offset number has been stored in the failure-base-station storage block 87. Since all of offset number storage units are cleared to zero in the step P1, the check result becomes "No.", and then, the process operation is advanced to a step S10. Process operations defined from the step S10 to a step S13 are carried out in a similar manner to those of the prior art. As the succeeding operations, there are four sets of the below-mentioned operation routes.

A first operation route corresponds to such an operation that the process operation is executed via a step S16 to a step S19, and when a telephone communication is made with a telephone in the ground system via the base station and then is accomplished, the process operation is returned to the step S12. This operation is identical to that of the prior art, and process operations after the step S12 are returned to those identical to the above-described process operations.

In the second operation route, a check is made as to whether or not an instruction of commencing a telephone communication is issued from the base station via the paging channel in the step S19, and since the instruction of starting the telephone communication cannot be received, the process operation is returned to the step P2. In the step P2, a check is made as to whether or not the offset number of the base station presently under communication has been stored in the failure-base-station storage block 87.

In the operation executed at the first time, since all of the storage contents of the failure-base-station storage block 87 are cleared in the step P1, the check result becomes "No", and then the process operation is advanced to a step P3. In this step P3, an offset number of the corresponding base station is stored in the first offset number storage unit 88, and also, the counter value of the first counter unit 89 is set to "2" (note that "2" is one example, and larger numbers are actually set), and the process operation is returned to the step S3 (succeeding operations will be discussed as operation executed at second time).

Also, a third operation route is defined as follows. The process operation is executed through steps S13 to S14, and in a step S14, a check is made as to whether or not a base station having a pilot channel, the reception level of which is higher than the minimum receivable signal strength, is present in the peripheral base station list. Since such a base station is not present, the process operation is returned to the step S3. The succeeding operations are returned to the operations defined after the step S3 in the operation executed at the first time.

Furthermore, a fourth operation route is defined as follows. The process operation is executed through the steps S13 to S14, and in a step S15, a selection is made of such an offset number of a base station whose reception strength becomes maximum from the peripheral base station list, and a paging channel of this base station is receivable. Then, the process operation is returned to the step S12. The previously explained operations are repeatedly carried out in steps subsequent to the step S12.

Next, operations executed at a second time will now be explained. Process operations defined from a step S3 to a step S9 are identical to those executed at the first time. In a step P5, since the base station of the communication counter party under communication is correctly recognized from the data of the sink channel acquired in the step S8, a check is made as to whether or not the offset number of this base station under communication counter party has been stored in the failure-base-station storage block 87. Since the offset number stored in the first offset number storage unit 88 is present in the step P3 of the process operation at the first time, another check is made as to whether or not this offset number is identical to the offset number of the base station which is presently received.

In the case that this offset number is not made coincident with the offset number of the base station under reception, the process operation is advanced to a step S10. Process operations subsequent to this step S10 are identical to those defined after the step S10 in the operations executed at the first time. When this offset number is made coincident with the offset number of the base station under reception, the process operation is advanced to a step P6. In this step P6, the counter value of the first counter unit 89 is decremented by 1. Since the counter value of the first counter unit 89 is equal to "2" in the operations executed at the second time, which has been set in the operations executed at the first time, the resulting counter value becomes 2−1=1. Then, the process operation is advanced to a step P7. In the step P7, another check is made as to whether or not the counter value of the first counter unit 89 is equal to zero. Since this counter value is not equal to zero, the process operation is advanced to a step S3. Process operations subsequent to the step S3 will be explained as process operations executed at a third time.

Next, operations executed at a third time will now be explained. Process operations defined from a step S3 to a step P5 and up to a step P6 are similar to those executed at the second time. In the step P5, the counter value of the first counter unit 89 is decremented by 1. Since the counter value becomes 1 during the operation executed at the second time, the counter value becomes 1−1=0, and then, the process operation is advanced to a step P7. In the step P7, a check is made as to whether or not the counter value of the first counter unit 89 is equal to zero. Since this counter value is equal to zero, the offset number stored in the first offset number storage unit 88 is cleared, and then the process operation is returned to the step S3. In the step P5, in the case that the offset number is not made coincident with the offset number of the base station which is presently received, a process operation thereof is similar to the operation executed at the second time.

As previously explained, in accordance with this first embodiment mode, while the mobile station is arranged by the transmission/reception block 85, the logic control block 76, and the failure-base-station storage block 87, such a CDMA portable telephone apparatus capable of quickly selecting the base station which may constitute the communication counter party can be provided, since when the logic control block 76 selects one base station from a plurality of base stations via the transmission/reception block 85 so as to set the telephone communication line, in the case that no response is made from the selected base station and setting of the telephone communication line fails, this logic control block 76 stores the selected base station into the failure-base-station storage block 87, and excludes the selection of such a base station which has been stored into the failure-base-station storage block 87 during the next selecting operation of the base station.

[Second Embodiment Mode]

Figure 5:
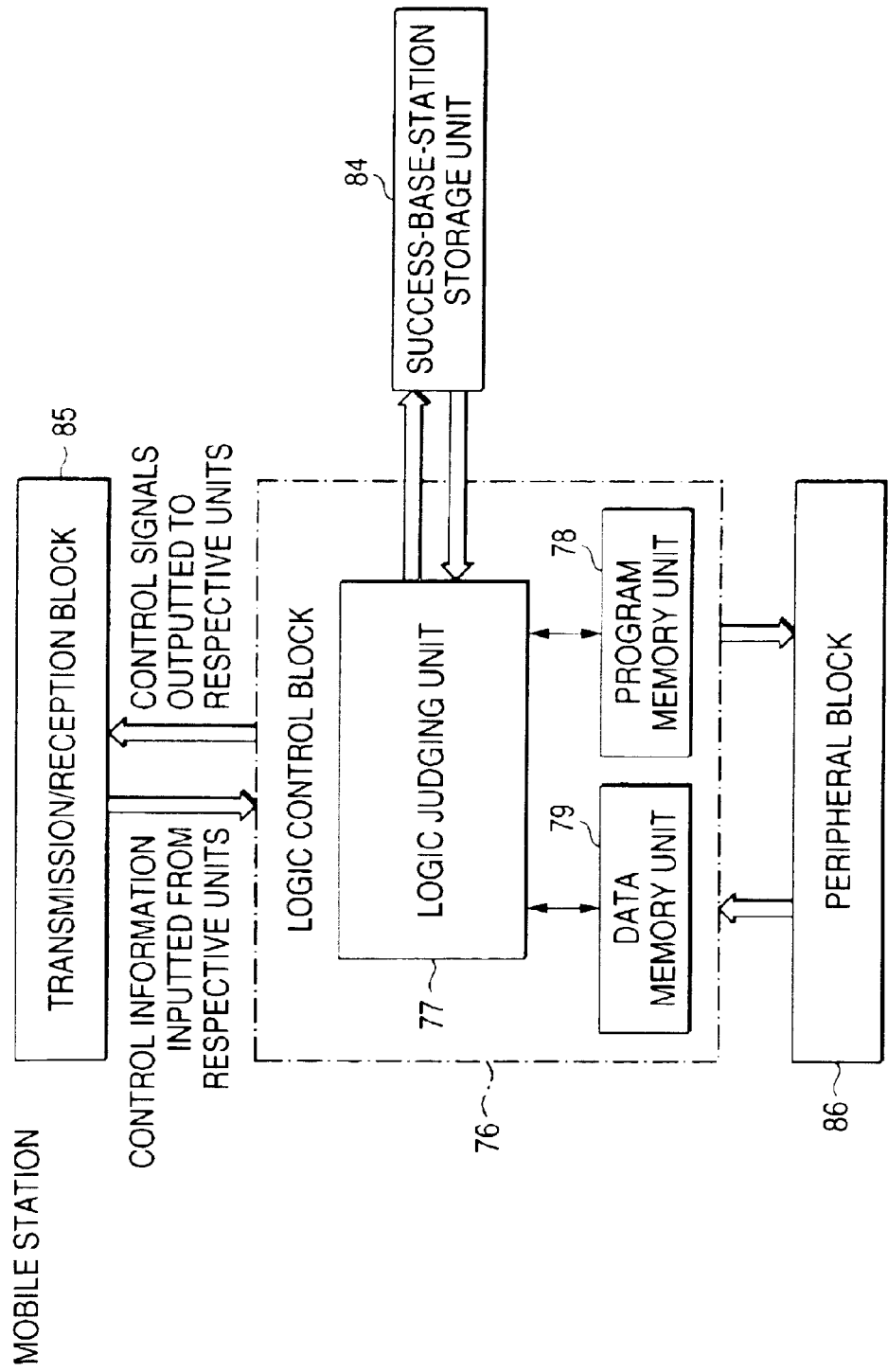
FIG. 5 is a block diagram for indicating a CDMA portable telephone apparatus (mobile station) according to a second embodiment mode of the present invention.

FIG. 5 is a block diagram for representing a CDMA portable telephone apparatus (will be referred to as a "mobile station" hereinafter) according to a second embodiment mode of the present invention. In this drawing, the mobile station according to the second embodiment mode is arranged by employing a transmission/reception block 85, a logic control block 76, a peripheral block 86, and a success-base-station storage unit 84. The transmission/reception block 85 corresponds to a transmission/reception means described in a scope of claim. The logic control block 76 corresponds to a logic control means which contains a logic judging unit 77, a program memory unit 78, and a data memory unit 79. The success-base-station storage unit 84 corresponds to a success-base-station storage means. It should be noted that the same reference numbers shown in FIG. 15 (prior art) will be employed for denoting the same structural units shown in FIG. 5, and explanations thereof are omitted. The mobile station of this second embodiment mode indicated in FIG. 5 owns a different point from the conventional mobile station indicated in FIG. 15 such that the success-base-station storage unit 84 is additionally provided.

Figure 6:
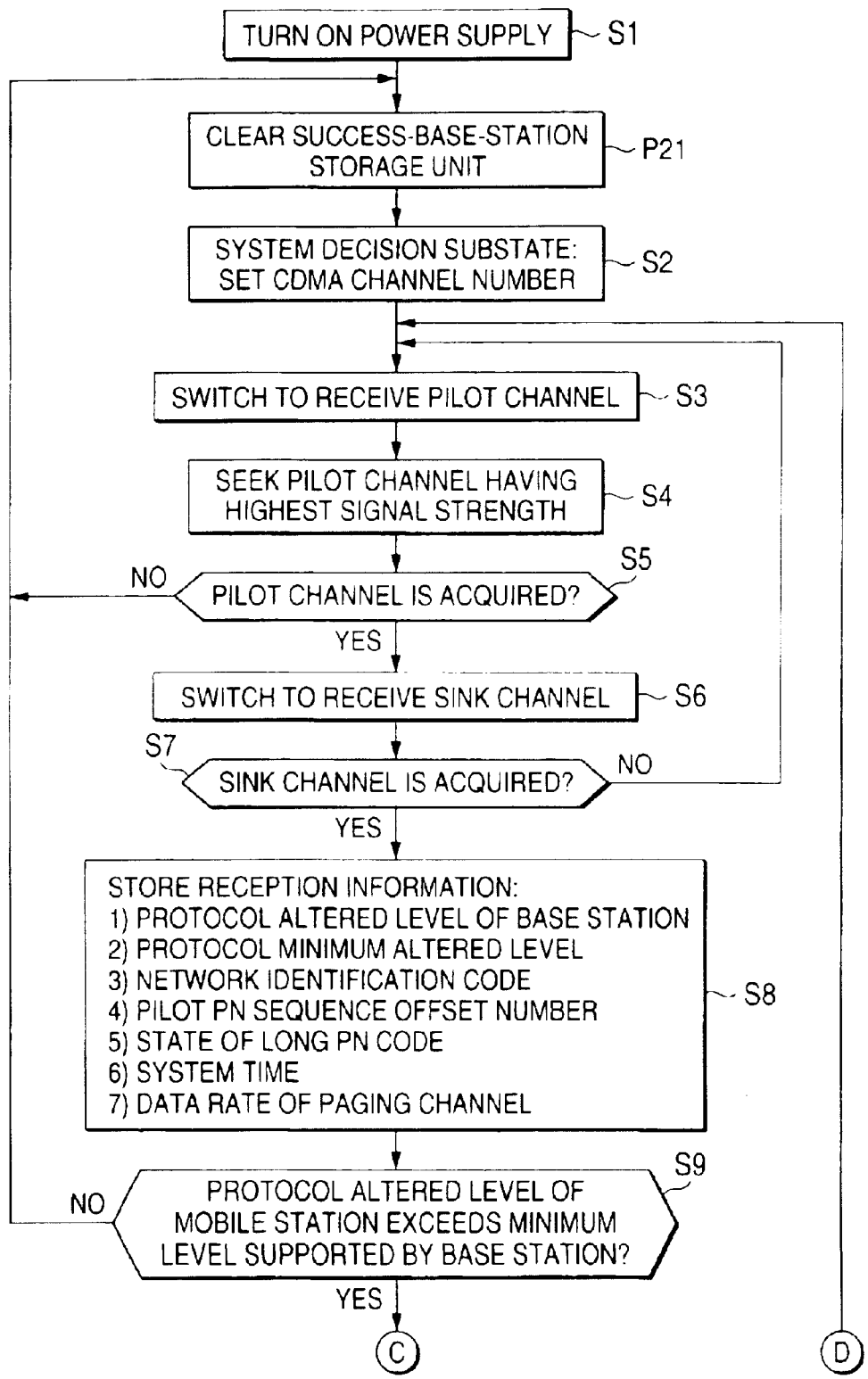
FIG. 6 is a detailed flow chart for explaining operations executed in that the mobile station of the second embodiment mode selects a base station.
Figure 8:
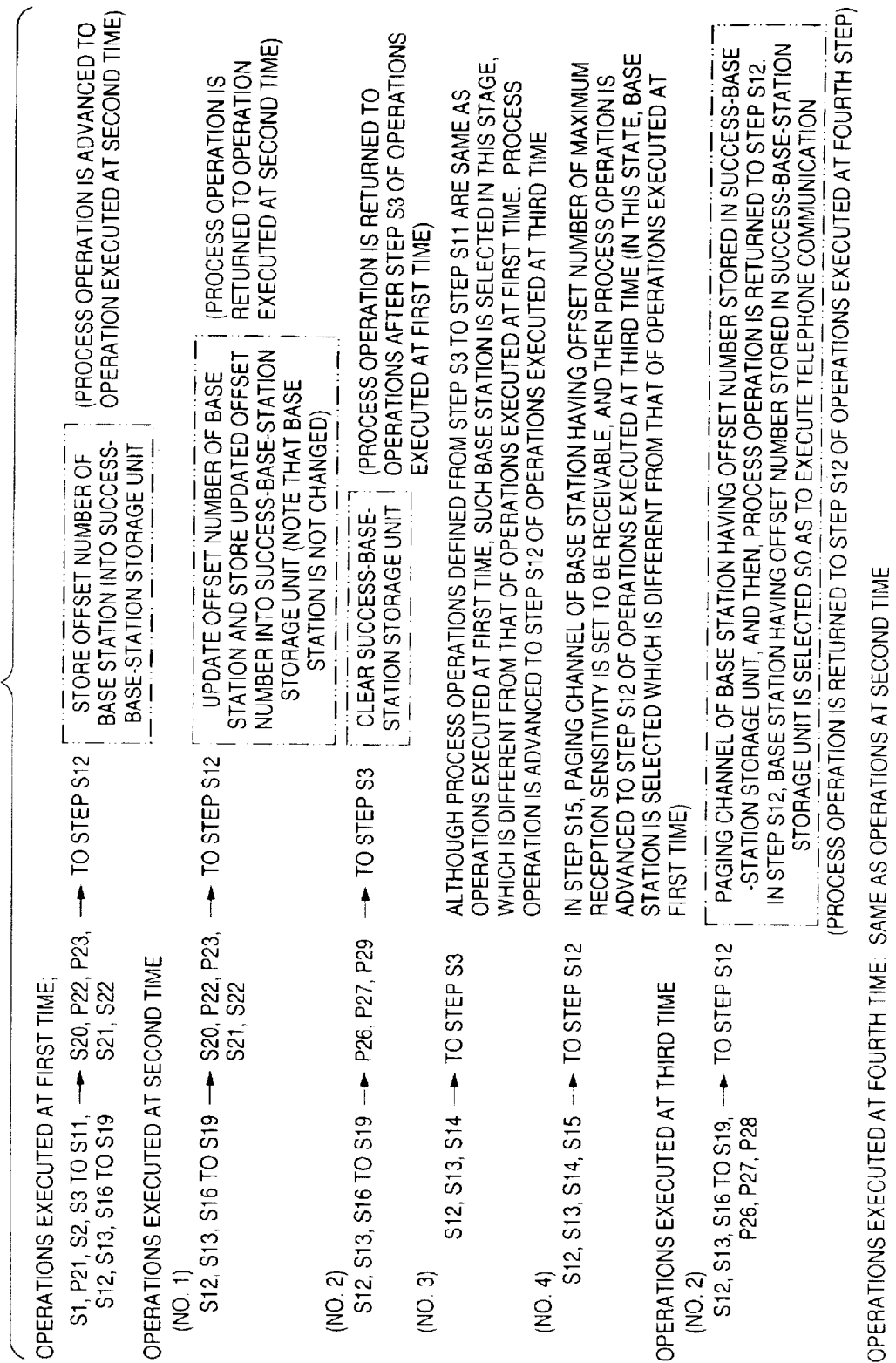
FIG. 8 is an explanatory diagram for explaining an operation route of the detailed flow chart of FIG. 6.

FIG. 6 and FIG. 7 are detailed flow charts for describing operations executed that the mobile station of the second embodiment mode selects a base station. FIG. 8 is an explanatory diagram for explaining operation routes of the detailed flow charts of FIG. 6 and FIG. 7. Next, base station selecting operations according to the second embodiment mode will now be described with reference to FIG. 5, FIG. 6, FIG. 7, and FIG. 8. It should also be understood that since the steps S1 to S22 shown in FIG. 6 and FIG. 7 are identical to the operation steps of the prior art, the same step numbers indicated in FIG. 21 and FIG. 22 (prior art) are employed to indicate these operation steps and explanations thereof are omitted.

Since steps P21 to P29 indicated in FIG. 6 and FIG. 7 correspond to process operations which are newly added in this embodiment mode in order to improve the conventional methods, the process operations of these steps P21 to P29 will be mainly explained.

A description is made of process operations executed in a first time. First, in a step S1, a power supply of the mobile station is turned ON. In the step P21, the success-base-station storage unit 84 is cleared, and then, the process operation is advanced to a step S2. A role of the success-base-station storage unit 84 will be explained in a step P22 to a step P29.

Process operation defined from the step S2 to a step S19 are the same as those of the prior art. In the step S19, in such a case that an instruction of commencing a telephone communication issued from the base station via the paging channel can be received, the process operation is advanced to a step S20. In the step S20, a preamble code is transmitted via a telephone communication channel to the base station, and then, the process operation is advanced to a step P22. In the step P22, a check is made as to whether or not the offset number of the base station has been stored in the success-base-station storage unit 84. Since the success-base-station storage unit 84 has been cleared and the offset number of the base station is not stored in the step P21, the process operation is advanced to a step P23. In the step P23, an offset number of a base station presently under communication is stored in the success-base-station storage unit 84, and then, the process operation is advanced to a step S21. Process operations after the step S21 are identical to those of the prior art. When a telephone communication is made with a telephone of a ground system via the base station and then this telephone communication is completed, the process operation is returned to the step S12. The operation steps defined up to this step S12 are represented as operations executed at a first time in FIG. 8. The succeeding process operations will be explained as operations executed at a second time.

The operations executed at the second time include the below-mentioned four sorts of operation routes.

A first operation route is identical to that of the operations executed at the first time, and corresponds to such an operation that the process operation is executed via a step S12 to a step S19, and when a telephone communication is made with a telephone set in the ground system via the base station and then is accomplished, the process operation is returned to the step S12. This first operation route owns a different point from the operations executed at the first time. That is, a check is made as to whether or not there is such a base station stored in the success-base-station storage unit 84 in a step P22. Since the offset number of the base station has been stored in the success-base-station storage unit 84 during the operations executed at the first time, the check result becomes "Yes", and then, the present offset number of the base station is overwritten in the success-base-station storage unit 84 in a step P24. In this case, the present offset number of the base station is identical to the previous offset number of the base station, so that there is no change in the storage content of the success-base-station storage unit 84.

A second operation route is identical to that of is the operations executed at the first time, and is executed through a step S12 to a step S19. In the second operation route, a check is made as to whether or not an instruction of commencing a telephone communication is issued from the base station via the paging channel in the step S19, and since the instruction of starting the telephone communication cannot be received, the process operation is advanced to a step S26. In the step P26, a check is made as to whether or not the offset number of the base station has been stored in the success-base-station storage unit 84. Since the offset number of the base station has been stored, the process operation is advanced to a step P27. In the step P27, another check is made as to whether or not the offset number of the base station stored in the success-base-station storage unit 84 is identical to such a base station which is presently communicated via the paging channel. Since this offset number of the base station is identical to the base station presently communicated via the paging channel, the process operation is advanced to a step P29. In the step P29, the offset number of the base station stored in the success-base-station storage unit 84 is cleared, and then, the process operation is advanced to a step S3. Process operations after the step S3 are similar to the operations executed at the first time.

A third operation route is identical to that of the operations executed at the first time, and is executed through steps S12 to S14, and in the step S14, a check is made as to whether or not a base station having a pilot channel, the reception level of which is higher than the minimum receivable signal strength, is present in the peripheral base station list. Since such a base station is not present, the process operation is returned to the step P3. In the steps S3 to S5, a pilot channel having the highest signal strength is searched, and then, the process operation is advanced via the step S6 to the step S11 to the step S12. Process operations subsequent to the step S12 will be explained as operations executed at a third time. An important aspect contained in the previously-explained operations is given as follows: That is, the base station which has been selected in the process operations from the step S3 to the step S5 is different from such a base station which was used in the first telephone communication.

A fourth operation route is identical to that of the operations executed at the first time, and is executed through the steps S12 to S15, and in the step S15, a paging channel of such a base station whose reception strength becomes maximum from the peripheral base station list is receivable. Then, the process operation is returned to the step S12. The previously explained operations are repeatedly carried out in steps subsequent to the step S12. An important aspect of this fourth operation route is such that the base station selected in this manner is different from the base station which was used in the first telephone communication. Process operations after the step S12 will be explained as the operations executed at the third time. The previous operations are indicated as the operations executed at the second time in FIG. 8.

As previously explained, a commencement of the operations executed at the third time is constituted by two cases, namely, in the case that the process operation is reached to the step S13 from the third operation route of the operations executed at the second time, and in such a case that the process operation is reached to the step S12 from the fourth operation route of the operations executed at the second time. Since the same operations are carried out in any cases, these operations will be commonly explained. The operations executed at the third time contain four sets of operation routes which are substantially similar to those executed at the second time. Since a feature of the present invention may appear in such an operation corresponding to the second operation route of the operations executed in the second time, only this featured operation will be explained.

That is, substantially similar to the second operation route of the operations executed at the second time, this operation route is executed through a step S12 to a step S19, and a check is made as to whether or not an instruction of commencing a telephone communication is issued from the base station via the paging channel in the step S19, and since the instruction of starting the telephone communication cannot be received, the process operation is advanced to the step P26. In the step P26, a check is made as to whether or not the offset number of the base station has been stored in the success-base-station storage unit 84. Since the offset number of the base station has been stored, the process operation is advanced to a step P27. In the step P27, another check is made as to whether or not the offset number of the base station stored in the success-base-station storage unit 84 is identical to such a base station which is presently communicated via the paging channel. In this case, since this operation route is different, namely not identical to the second operation route of the operations executed at the second time, the process operation is advanced to a step P28. In this step P28, the paging channel of the base station having the offset number stored in the success-base-station storage unit 84 is set to be receivable, and then, the process operation is returned to the step S12. Process operations after this step S12 will be explained as operations executed at a fourth time. The operations executed at the fourth time contain four sets of operation routes which are similar to those executed at the second time. Since a feature of the present invention may appear in such an operation corresponding to the first operation route of the operations executed in the second time, only featured operation will be described.

This featured process operation is executed via the step S12 to the step S19, and when a telephone communication is made with a telephone set in the ground system via the base station and then is accomplished in a step S21, the process operation is returned to the step S12. In this case, a check is made as to whether or not there is such a base station stored in the success-base-station storage unit 84 in a step P22. Since the offset number of the base station has been stored in the success-base-station storage unit 84, the check result becomes "Yes", and then, the present offset number of the base station is overwritten in the success-base-station storage unit 84 in a step P24. In this case, the present offset number of the base station is identical to the previous offset number of the base station, so that there is no change in the storage content of the success-base-station storage unit 84.

As previously explained, since the strength of the reception signal is lowered in the step S13 so that the base station to be communicated is changed, when a next telephone communication operation is established, in such a case that setting of this telephone communication may probably fail, such a base station which has been stored in the success-base-station storage unit 84 is selected. As a consequence, the establishment of the telephone communication line can succeed within a short time.

As previously explained, in accordance with this second embodiment mode, while the mobile station is arranged by the transmission/reception block 85, the logic control block 76, and the success-base-station storage unit 84, such a CDMA portable telephone apparatus capable of quickly selecting the base station which may constitute the communication counter party can be provided, since when the logic control block 76 selects one base station from a plurality of base stations via the transmission/reception block 85 so as to set the telephone communication line, in the case that the signal for instructing the commencement of the telephone communication is received from the selected base station, the base station selecting operation is carried out in such a manner that the selected base station is stored into the success-base-station storage means. In the next base station selecting operation, when the logic control block 76 selects one base station from a plurality of base stations so as to set the telephone communication line, in the case that no response is made from the selected base station and setting of the telephone communication line fails, if the selected base station is different from such a base station stored in the success-base-station storage unit 84, then the logic control block 76 is set in such a manner that the base station stored in the success-base-station storage unit 84 is selected, and then, again executes the base station selecting operation.

[Third Embodiment Mode]

Figure 9:
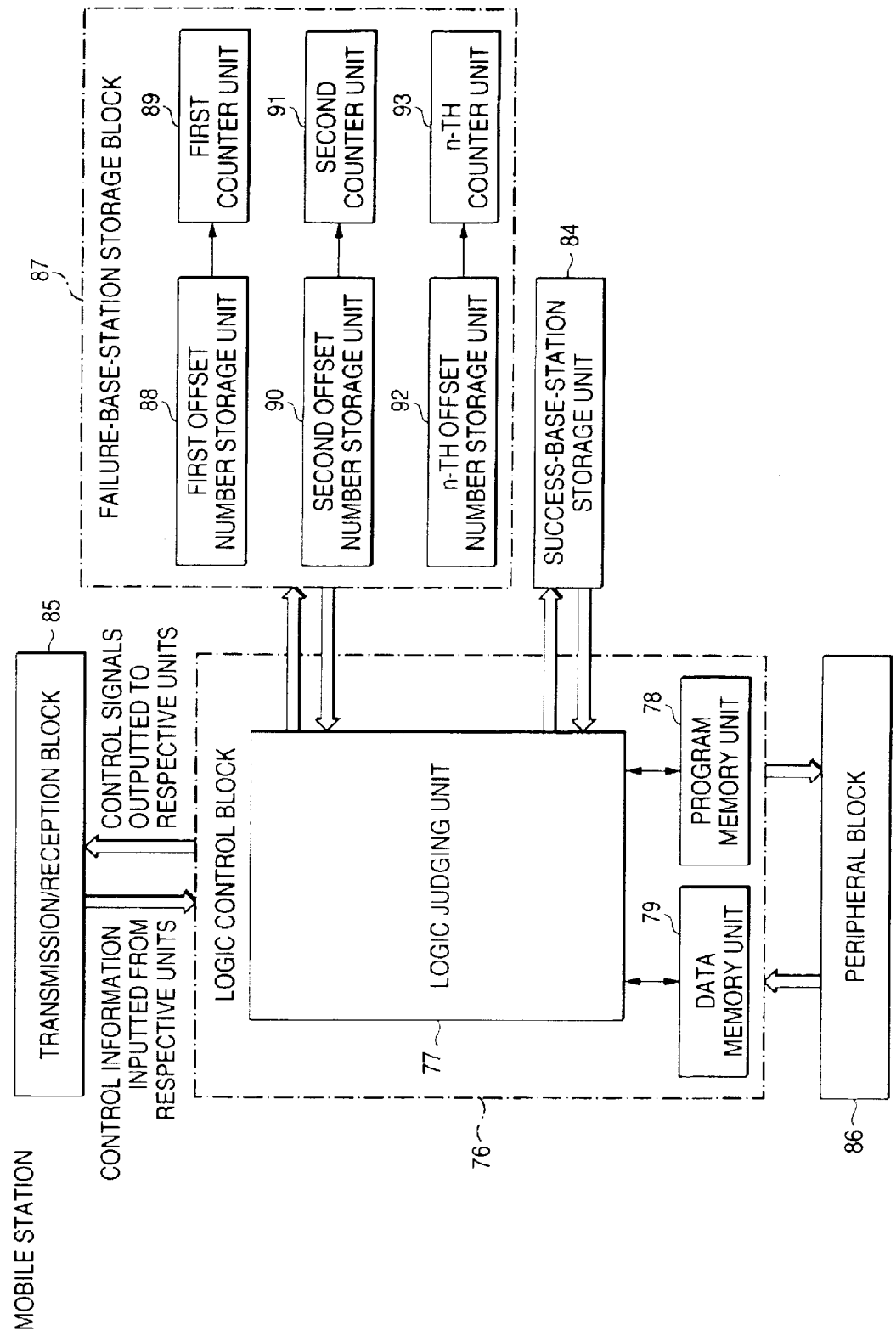
FIG. 9 is a block diagram for indicating a CDMA portable telephone apparatus (mobile station) according to a third embodiment mode of the present invention.

FIG. 9 is a block diagram for representing a CDMA portable telephone apparatus (will be referred to as a "mobile station" hereinafter) according to a third embodiment mode of the present invention. In this drawing, the mobile station according to the third embodiment mode is arranged by employing a transmission/reception block 85, a logic control block 76, a peripheral block 86, a failure-base-station storage block 87, and a success-base-station storage unit 84. The transmission/reception block 85 corresponds to a transmission/reception means described in a scope of claim. The logic control block 76 corresponds to a logic control means which contains a logic judging unit 77, a program memory unit 78, and a data memory unit 79. The failure-base-station storage block 87 corresponds to a failure-base-station storage means. This failure-base-station storage block 87 contains a first offset number storage means 88, a second offset number storage unit 90, and an n-th offset number storage unit 92, which correspond to a base station offset number storage means; and a first counter unit 89, a second counter unit 91, and an n-th counter unit 93, which correspond to a counter means. The success-base-station storage unit 84 corresponds to a success-base-station storage means.

It should also be noted that the same reference numbers shown in FIG. 15 (prior art) will be employed for denoting the same structural units shown in FIG. 9, and explanations thereof are omitted. The mobile station of this third embodiment mode indicated in FIG. 9 owns a different point from the conventional mobile station indicated in FIG. 15 such that both the success-base-station storage unit 84 and the failure-base-station storage block 87 are additionally provided. The failure-base-station storage block 87 includes a preselected number of offset number storage units 88, 90, 92, which store thereinto offset numbers of base stations, and also, a preselected number of counter units 89, 91, 93, which store thereinto predetermined count values.

Figure 10:
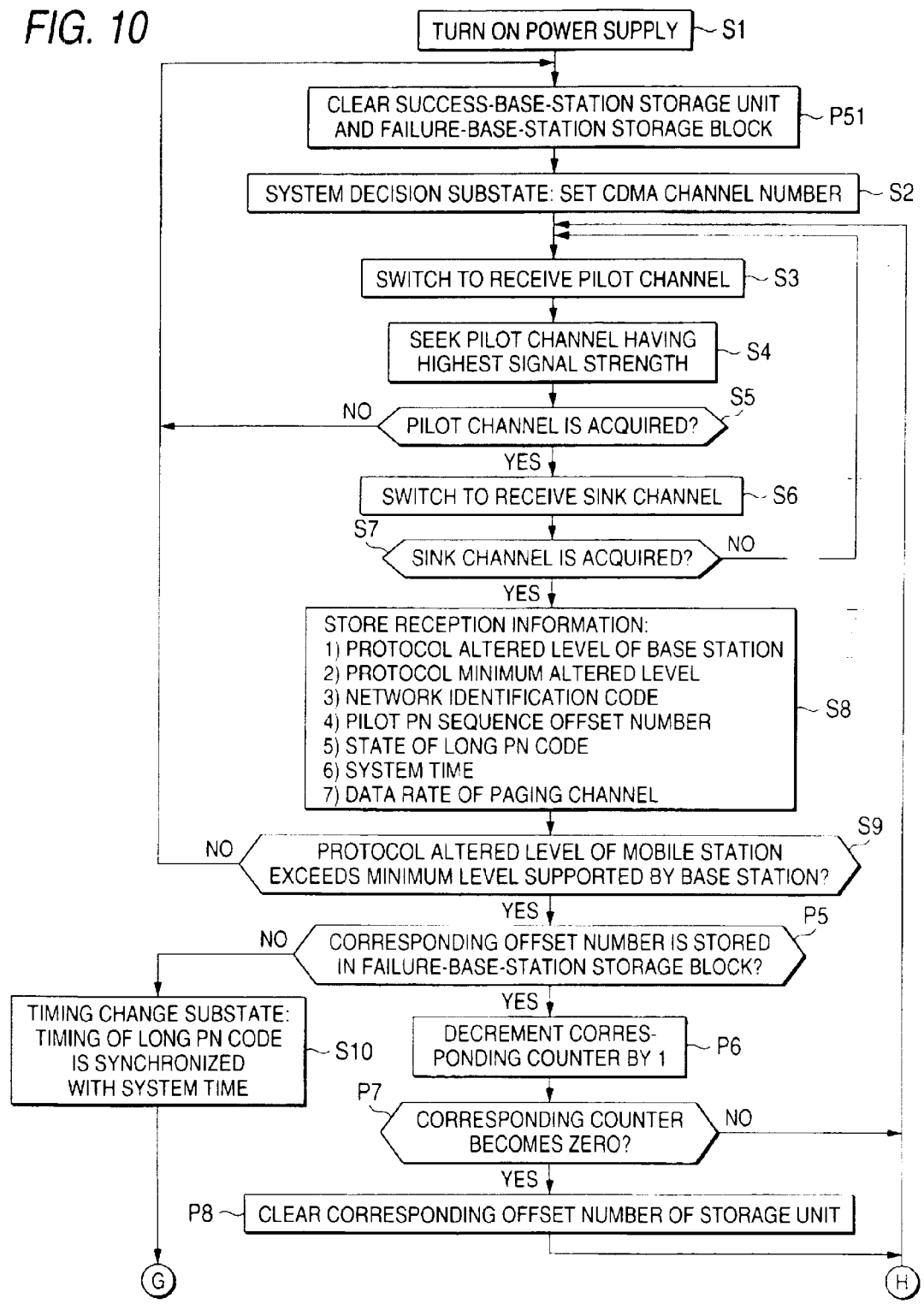
FIG. 10 is a detailed flow chart for explaining operations executed in that the mobile station of the third embodiment mode selects a base station.
Figure 13:
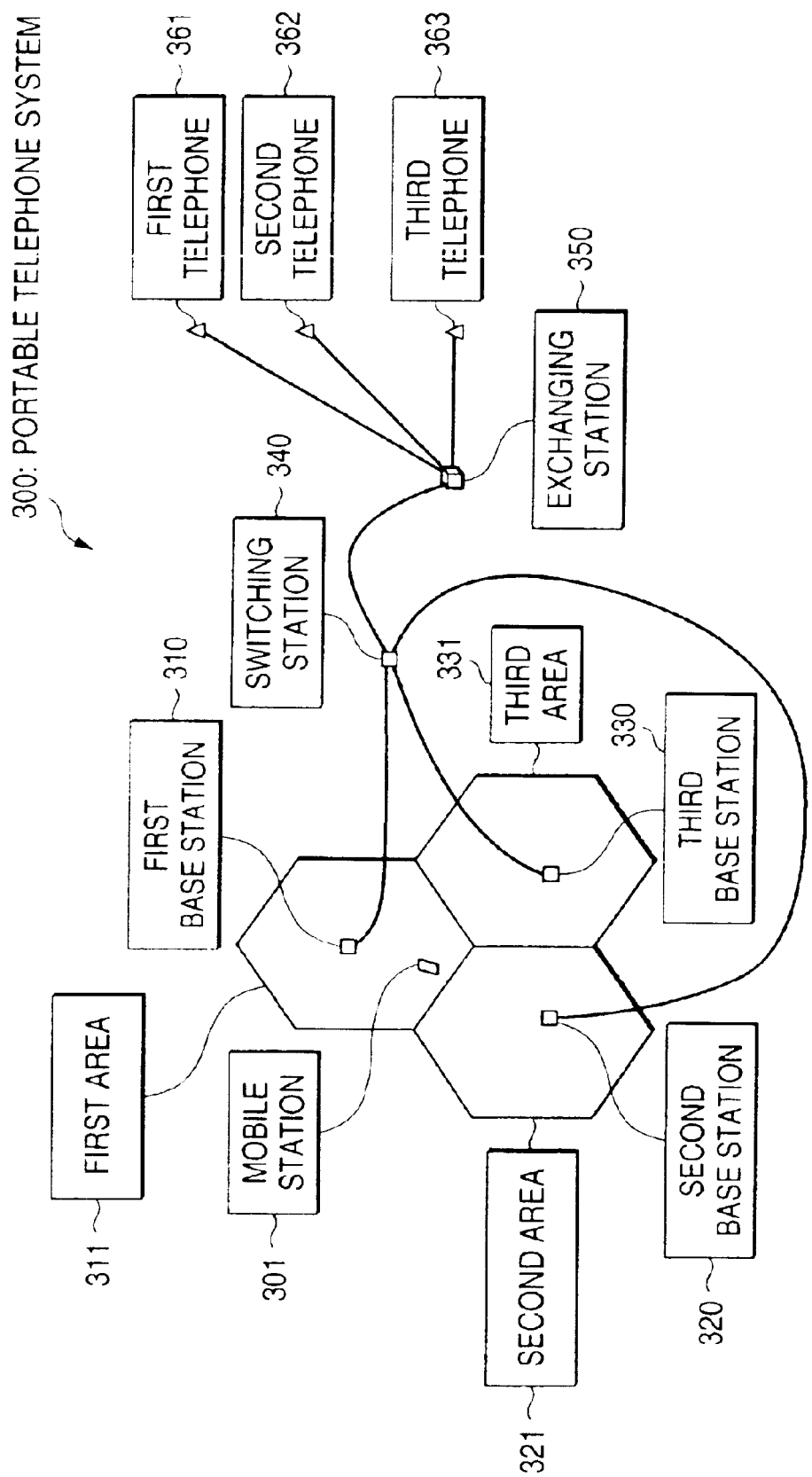
FIG. 13 is a block diagram for representing the arrangement of the conventional CDMA portable telephone system.
Figure 14:
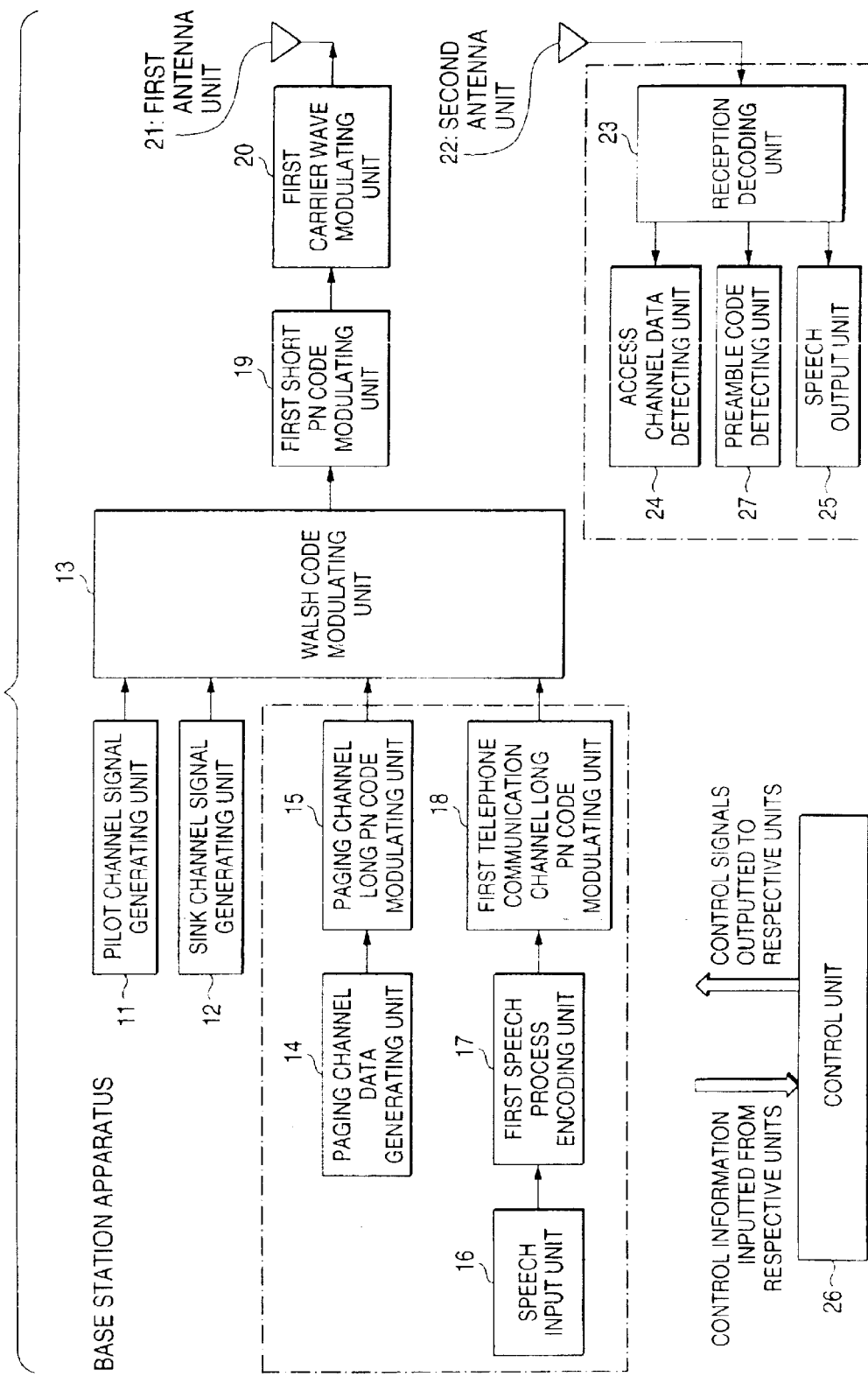
FIG. 14 is a block diagram for indicating the arrangement of the conventional base station apparatus.

FIG. 10 and FIG. 11 are detailed flow charts for describing operations executed in that the mobile station of the third embodiment mode selects a base station. FIG. 12 is an explanatory diagram for explaining operation routes of the detailed flow charts of FIG. 10 and FIG. 11. Next, base station selecting operations according to the third embodiment mode will now be described with reference to FIG. 9, FIG. 10, FIG. 11, and FIG. 12. It should also be understood that since the steps S1 to S22 shown in FIG. 10 and FIG. 11 are identical to the operation steps of the prior art, the same step numbers indicated in FIG. 21 and FIG. 22 (prior art) are employed to indicate these operation steps and explanations thereof are omitted.

Since a step P51, steps P2 to P8, and steps P22 to P29 indicated in FIG. 10 and FIG. 11 correspond to process operations which are newly added in this embodiment mode in order to improve the conventional method. It should be understood that the steps P2 to P8 correspond to those explained in the first embodiment mode, and the steps P22 to P29 correspond to those described in the second embodiment mode. In other words, the third embodiment mode corresponds to such an embodiment mode constituted by combining the first embodiment mode with the second embodiment mode.

First, operations executed at a first time will now be explained. As represented in FIG. 12, four sorts of operations are carried out, which are indicated by a first operation route, a second operation route, a third operation route, and a fourth operation route.

In the first operation route, first, in a step S1, a power supply of the mobile station is turned ON. In the step P51, offset numbers are cleared which are stored in the first offset number storage unit 88, the second offset number storage unit 90, and the n-th offset storage unit 92 of the failure-base-station storage block 87, and also, counter values of the first counter unit 89, the second counter unit 91, and the n-th counter unit 89 are reset to zero. Also, the success-base-station storage unit 84 is cleared. Then, the process operation is advanced to a step S2. The process operation defined from steps S2 to S9 are identical to those of the prior art. A process operation defined at a step P5 is the process operation which has already been explained in the first embodiment mode, and then, the process operation is advanced to a step S10. Process operations defined from the step S10 to a step S13 are carried out in a similar manner to those of the prior art. As the succeeding operations, there are four sets of the below-mentioned operation routes.

A first operation route corresponds to such an operation that the process operation is executed via a step S16 to a step S19, and a preamble code is transmitted via a telephone communication channel to the base station in a step S20, and then, the process operation is advanced to a step P22. In the step P22, a check is made as to whether or not the offset number of the base station has been stored in the success-base-station storage unit 84. Since the success-base-station storage unit 84 has been cleared and the offset number of the base station is not stored in the step P51, the process operation is advanced to a step P23. In the step P23, an offset number of a base station presently under communication is stored in the success-base-station storage unit 84, and then, the process operation is advanced to a step S21. Process operations after the step S21 are identical to those of the prior art. That is, when a telephone communication is made with a telephone set of a ground system via the base station and then this telephone communication is completed, the process operation is returned to the step S12. The succeeding process operations will be explained as operations executed at a second B time.

In the second operation route, a check is made as to whether or not an instruction of commencing a telephone communication is issued from the base station via the paging channel in the step S19, and since the instruction of starting the telephone communication cannot be received, the process operation is returned to a step S26. In the step P26, a check is made as to whether or not the offset number of the base station has been stored in the success-base-station storage unit 84, and since of the storage content of the success-base-station storage unit 84 is cleared in the step P51 and is not stored, the process operation is advanced to a step P23. In the step P2, a check is made as to whether or not the offset number of the base station presently under communication has been stored in the failure-base-station storage block 87. In the operation executed at the first time, since all of the storage contents of the failure-base-station storage block 87 are cleared in the step P51, the check result becomes "No", and then the process operation is returned to the step P3. In this step P3, an offset number of the corresponding base station is stored in the first offset number storage unit 88, and also, the counter value of the first counter unit 89 is set to "2" (note that "2" is one example, and larger numbers are actually set), and the process operation is returned to the step S3 (succeeding operations will be discussed as operation executed at second A time).

Also, a third operation route is defined as follows. The process operation is executed through steps S13 to S14, and in the step S14, a check is made as to whether or not a base station having a pilot channel, the reception level of which is higher than the minimum receivable signal strength, is present in the peripheral base station list. Since such a base station is not present, the process operation is returned to the step S3. The succeeding operations are returned to the operations defined after the step S3 in the operation executed at the first time.

A fourth operation route is defined as follows. The process operation is executed through the steps S13 to S14, to a step S15, and in this step S15, a selection is made of such an offset number of a base station whose reception strength becomes maximum from the peripheral base station list, and a paging channel of this base station is set to be receivable. Then, the process operation is returned to the step S12. The previously explained process operations after the step S12 of the operations executed at the first time are repeatedly carried out in steps subsequent to the step S12.

The operations executed at the second A time are identical to the operations executed at the second time of the first embodiment mode shown in FIG. 4, and then, are advanced to operations executed at a third A time. The operations executed at the third A time are identical to the operations executed at the third time of the first embodiment mode shown in FIG. 4.

Also, operations executed at a second B time are carried out in the same manners to either the third operation route or the fourth operation route of the operations executed at the second embodiment mode shown in FIG. 8, and then are advanced to operations executed at a third B time. The operations executed at the third B time are carried out in the same manner to the second operation route of the operations executed at the third time of the second embodiment mode indicated in FIG. 8, and then are advanced to operations executed at a fourth B time. The operations executed at the fourth B time are carried out in the same manner to the operations executed at the fourth time of the second embodiment mode shown in FIG. 8.

As previously explained, in accordance with this third embodiment mode, while the mobile station is arranged by the transmission/reception block 85, the logic control block 76, and the failure-base-station storage block 87, and the success-base-station storage unit 84, such a CDMA portable telephone apparatus capable of quickly selecting the base station which may constitute the communication counter party can be provided, since when the logic control block 76 selects one base station from a plurality of base stations via the transmission/reception block 85 so as to set the telephone communication line, in the case that no response is made from the selected base station and setting of the telephone communication line fails, this logic control block 76 stores the selected base station into the failure-base-station storage block 87, and excludes the selection of such a base station which has been stored into the failure-base-station storage block 87 during the next selecting operation of the base station. In addition, in such a case that the signal for instructing the commencement of the telephone communication is received from the selected base station, the base station selecting operation is carried out in such a manner that the selected base station is stored into the success-base-station storage unit 84. In the next base station selecting operation, when the logic control block 76 selects one base station from a plurality of base stations so as to set the telephone communication line, in the case that no response is made from the selected base station and setting of the telephone communication line fails, if the selected base station is different from such a base station stored in the success-base-station storage unit 84, then the logic control block 76 is set in such a manner that the base station stored in the success-base-station storage unit 84 is selected, and then, again executes the base station selecting operation.

It should be understood that the present patent application has been made based upon Japanese Patent Application No. 2001-101698 filed on Mar. 30, 2001, and contents of this Japanese patent application are incorporated as references.

INDUSTRIAL APPLICABILITY

As previously explained, in accordance with the CAMA portable telephone apparatus of the present invention, when the logic control means selects one base station from a plurality of base stations via the transmission/reception means so as to set the telephone communication line, in the case that no response is made from the selected base station and setting of the telephone communication line fails, this logic control means stores the selected base station into the failure-base-station storage means, and excludes the selection of such a base station which has been stored into the failure-base-station storage means during the next selecting operation of the base station.

As a consequence, since the base station which constitutes the communication counter party can be quickly selected, the establishment of the telephone line can succeed within a short time period.

Also, when the logic control means selects one base station from a plurality of base stations via the transmission/reception means so as to set the telephone communication line, in the case that the telephone communication start instructing signal is received from the selected base station and thus setting of the communication line can succeed, the base station selecting operation is carried out in such a manner that the selected base station is stored into the success-base-station storage means. In the next base station selecting operation, when the logic control block 76 selects one base station from a plurality of base stations so as to set the telephone communication line, in the case that no response is made from the selected base station and setting of the telephone communication line fails, if the selected base station is different from such a base station stored in the success-base-station storage means, then the logic control means is set in such a manner that the base station stored in the success-base-station storage means is selected, and then, again executes the base station selecting operation.

Moreover, when the logic control means selects one base station from a plurality of base stations so as to set the telephone communication line, in the case that no response is made from the selected base station and setting of the telephone communication line fails, if the selected base station is made coincident with the base station stored in the success-base-station storage means, then the storage content of the success-base-station storage means is deleted.

As a consequence, since the base station which constitutes the communication counter party can be quickly selected, the establishment of the telephone line can succeed within a short time period.

What is claimed is:

1. A CDMA portable telephone apparatus comprising:

transmission/reception means;

logic control means; and failure-base-station storage means;

wherein:

while said logic control means selects one base station from a plurality of base stations via said transmission/reception means so as to set a telephone communication line, in such a case that no response is issued from the selected base station and setting of the telephone communication line fails, said logic control means stores said selected base station into said failure-base-station storage means; and in a next selecting operation for a base station, said logic control means excludes the selecting operation of the base station stored in said failure-base-station storage means.

2. A CDMA portable telephone apparatus as claimed in claim 1, wherein:

said failure-base-station storage means of said CDMA portable telephone apparatus is comprised of:

base station offset number storage means for storing thereinto an offset number of a pilot channel of a base station; and counter means;

in the case that no response is issued from a selected base station and setting of a communication line fails, said logic control means stores an offset number of said selected base station into said base station offset number storage means, and sets a predetermined value to said counter means; and in a next selecting operation for a base station, when said logic control means again selects the base station stored in said base station offset number storage means, said logic control means decrements the value of said counter means by 1 and again executes a selecting operation for a base station.

3. A CDMA portable telephone apparatus comprising:

transmission/reception means;

logic control means; and success-base-station storage means;

wherein:

while said logic control means selects one base station from a plurality of base stations via said transmission/reception means so as to set a telephone communication line, in the case that a telephone communication start instructing signal is received from the selected base station and setting of the communication line succeeds, said logic control means stores said selected base station into said success-base-station storage means; and in a next selecting operation for a base station, in such a case that no response is issued from the selected base station and setting of the telephone communication line fails, if said selected base station is different from the base station stored in said success-base-station storage means, then said logic control means sets to select the base station stored in said success-base-station storage means, and again executes a selecting operation for a base station.

4. A CDMA portable telephone apparatus as claimed in claim 1, further comprising:

success-base-station storage means; and while said logic control means selects one base station from a plurality of base stations via said transmission/reception means so as to set a telephone communication line, in the case that a telephone communication start instructing signal is received from the selected base station and setting of the communication line succeeds, said logic control means stores said selected base station into said success-base-station storage means; and in a next selecting operation for a base station, while said logic control means selects one base station from a plurality of base stations so as to set a telephone communication line, in such a case that no response is issued from the selected base station and setting of the telephone communication line fails, if said selected base station is different from the base station stored in said success-base-station storage means, then said logic control means sets to select the base station stored in said success-base-station storage means, and again executes a selecting operation for a base station.

5. A CDMA portable telephone apparatus as claimed in claim 3, or claim 4, wherein:

while said logic control means selects one base station from a plurality of base stations via said transmission/reception means so as to set a telephone communication line, in such a case that no response is issued from the selected base station and setting of the telephone communication line fails, if said selected base station is made coincident with the base station stored in said success-base-station storage means, then said logic control means deletes the storage content of said success-base-station storage means.

* * * * *